US012631779B2

(12) United States Patent
Halliday et al.

(10) Patent No.: US 12,631,779 B2
(45) Date of Patent: May 19, 2026

(54) REFLECTION SEISMOLOGY INVERSION WITH QUALITY CONTROL

(71) Applicant: Schlumberger Technology Corporation, Sugar Land, TX (US)

(72) Inventors: David Fraser Halliday, Cambridge (GB); Robert Bloor, Missouri City, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 199 days.

(21) Appl. No.: 18/702,401

(22) PCT Filed: Jan. 13, 2023

(86) PCT No.: PCT/US2023/060637
§ 371 (c)(1),
(2) Date: Apr. 18, 2024

(87) PCT Pub. No.: WO2023/137434
PCT Pub. Date: Jul. 20, 2023

(65) Prior Publication Data
US 2025/0258310 A1     Aug. 14, 2025

Related U.S. Application Data

(60) Provisional application No. 63/299,222, filed on Jan. 13, 2022.

(51) Int. Cl.
*G01V 1/36* (2006.01)
*G01V 1/28* (2006.01)
(Continued)

(52) U.S. Cl.
CPC .............. *G01V 1/366* (2013.01); *G01V 1/282* (2013.01); *G01V 1/305* (2013.01); *G01V 1/40* (2013.01);
(Continued)

(58) Field of Classification Search
CPC ........ G01V 1/366; G01V 1/282; G01V 1/305; G01V 1/40; G01V 2210/1212;
(Continued)

(56) References Cited

U.S. PATENT DOCUMENTS

2018/0347320 A1* 12/2018 Renaudeau ............. G06F 30/20
2019/0302293 A1* 10/2019 Zhang ................... G01V 1/282
(Continued)

FOREIGN PATENT DOCUMENTS

WO        2013093468 A2      6/2013

OTHER PUBLICATIONS

Search Report and Written Opinion of International Patent Application No. PCT/US2023/060637 dated Apr. 18, 2023, 9 pages.
(Continued)

*Primary Examiner* — Krystine E Breier
(74) *Attorney, Agent, or Firm* — Kyle R. Miiller

(57) ABSTRACT

A method can include receiving seismic data of a subsurface region; performing an iterative full waveform inversion using at least a portion of the seismic data to generate a model of the subsurface region, where the performing includes, after one or more iterations of the full waveform inversion, automatically selecting one or more parts of the seismic data for inclusion in the at least a portion of the seismic data based on data classification using one or more quality attributes; and outputting the model of the subsurface region.

17 Claims, 17 Drawing Sheets

Method 1500

Receive Seismic Data
1510

CRM 1511

Iteratively Invert w/automatic selection of one or more parts of seismic data based on classification using one or more quality attributes
1520

CRM 1521

Output Model
1530

CRM 1531

(51) Int. Cl.
G01V 1/30 (2006.01)
G01V 1/40 (2006.01)

(52) U.S. Cl.
CPC ................ *G01V 2210/1212* (2013.01); *G01V 2210/1299* (2013.01); *G01V 2210/42* (2013.01); *G01V 2210/614* (2013.01); *G01V 2210/6222* (2013.01)

(58) Field of Classification Search
CPC ....... G01V 2210/1299; G01V 2210/42; G01V 2210/614; G01V 2210/6222
See application file for complete search history.

(56) References Cited

U.S. PATENT DOCUMENTS

2021/0311215 A1  10/2021  Liu
2022/0221603 A1*   7/2022  Kpadonou ............. G01V 1/303

OTHER PUBLICATIONS

Bi, H. et al., "Impact of adaptive data selection on full waveform inversion", SEG Technical Program Expanded Abstracts, 2014, pp. 1094-1098.

Cobo, Y. et al., "Assessing sparse-node geometries with Full-waveform inversion for a deep water play in Santos Basin", SEG Technical Program Expanded Abstracts, 2021, pp. 742-746.

Engquist, B. et al., "Optimal Transport for Seismic Full Waveform Inversion", Communications in Mathematical Sciences, 2016, 14(8), pp. 2309-2330.

Glaccum, K. et al., "Complete full-waveform inversion solution to model building: A Perdido regional case study", SEG Technical Program Expanded Abstracts, 2021, pp. 647-651.

Gorszczyk, A., et al., "Regional-scale FWI of wide-angle OBN data from a crude initial model using graph-space optimal transport", SEG Technical Program Expanded Abstracts, 2021, pp. 707-711.

Jiao, K. et al., "Adjustive full waveform inversion", SEG Technical Program Expanded Abstracts, 2015, pp. 1091-1095.

Moore, I. et al., "Data studies of simultaneous source separation using robust linear algebra", SEG Technical Program Expanded Abstracts, 2016, pp. 4623-4627.

Warner, M. et al., "Adaptive waveform inversion: Theory", Geophysics, 2016, 81(6), pp. R429-R445.

Zhang, Z. et al., "Adaptive data-selection elastic full-waveform inversion", SEG Technical Program Expanded Abstracts, 2018, pp. 5163-5167.

Van Herwaarden, D. P. et al., "Accelerated full-waveform inversion using dynamic mini-batches", Geophysical Journal International, 2020, vol. 221, pp. 1427-1438.

* cited by examiner

System 100

Method 700

Initial Model
710

Compute Gradients/
Model Perturbations
740

Full Waveform
Synthetic Gathers
720

Seismic Gathers 730

1210

1230

1310

1330

1400

Method 1500

Receive Seismic Data
1510

CRM 1511

Iteratively Invert w/automatic selection of one or more parts of seismic
data based on classification using one or more quality attributes
1520

CRM 1521

Output Model
1530

CRM 1531

REFLECTION SEISMOLOGY INVERSION WITH QUALITY CONTROL

RELATED APPLICATION

This application is a National Stage Entry of International Application No. PCT/US2023/060637, filed Jan. 13, 2023, which claims priority to and the benefit of a U.S. Provisional Application having Ser. No. 63/299,222, filed Jan. 13, 2022, which is incorporated herein by reference in its entirety.

BACKGROUND

Reflection seismology finds use in geophysics, for example, to estimate properties of subsurface formations (e.g., to characterize a subterranean environment with one or more formations). As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Propagation of seismic energy, as in reflection seismology, can depend on one or more characteristics of a subsurface medium or media. Reflection seismology data can be used to understand or characterize one or more subsurface formations.

SUMMARY

A method can include receiving seismic data of a subsurface region; performing an iterative full waveform inversion using at least a portion of the seismic data to generate a model of the subsurface region, where the performing includes, after one or more iterations of the full waveform inversion, automatically selecting one or more parts of the seismic data for inclusion in the at least a portion of the seismic data based on data classification using one or more quality attributes; and outputting the model of the subsurface region. A system can include a processor; memory accessible by the processor; and processor-executable instructions stored in the memory that are executable to instruct the system to: receive seismic data of a subsurface region; perform an iterative full waveform inversion using at least a portion of the seismic data to generate a model of the subsurface region, where the performance includes, after one or more iterations of the full waveform inversion, automatic selection of one or more parts of the seismic data for inclusion in the at least a portion of the seismic data based on data classification using one or more quality attributes; and output the model of the subsurface region. One or more computer-readable storage media can include computer-executable instructions executable to instruct a computer to: receive seismic data of a subsurface region; perform an iterative full waveform inversion using at least a portion of the seismic data to generate a model of the subsurface region, where the performance includes, after one or more iterations of the full waveform inversion, automatic selection of one or more parts of the seismic data for inclusion in the at least a portion of the seismic data based on data classification using one or more quality attributes; and output the model of the subsurface region. Various other examples of methods, devices, systems, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
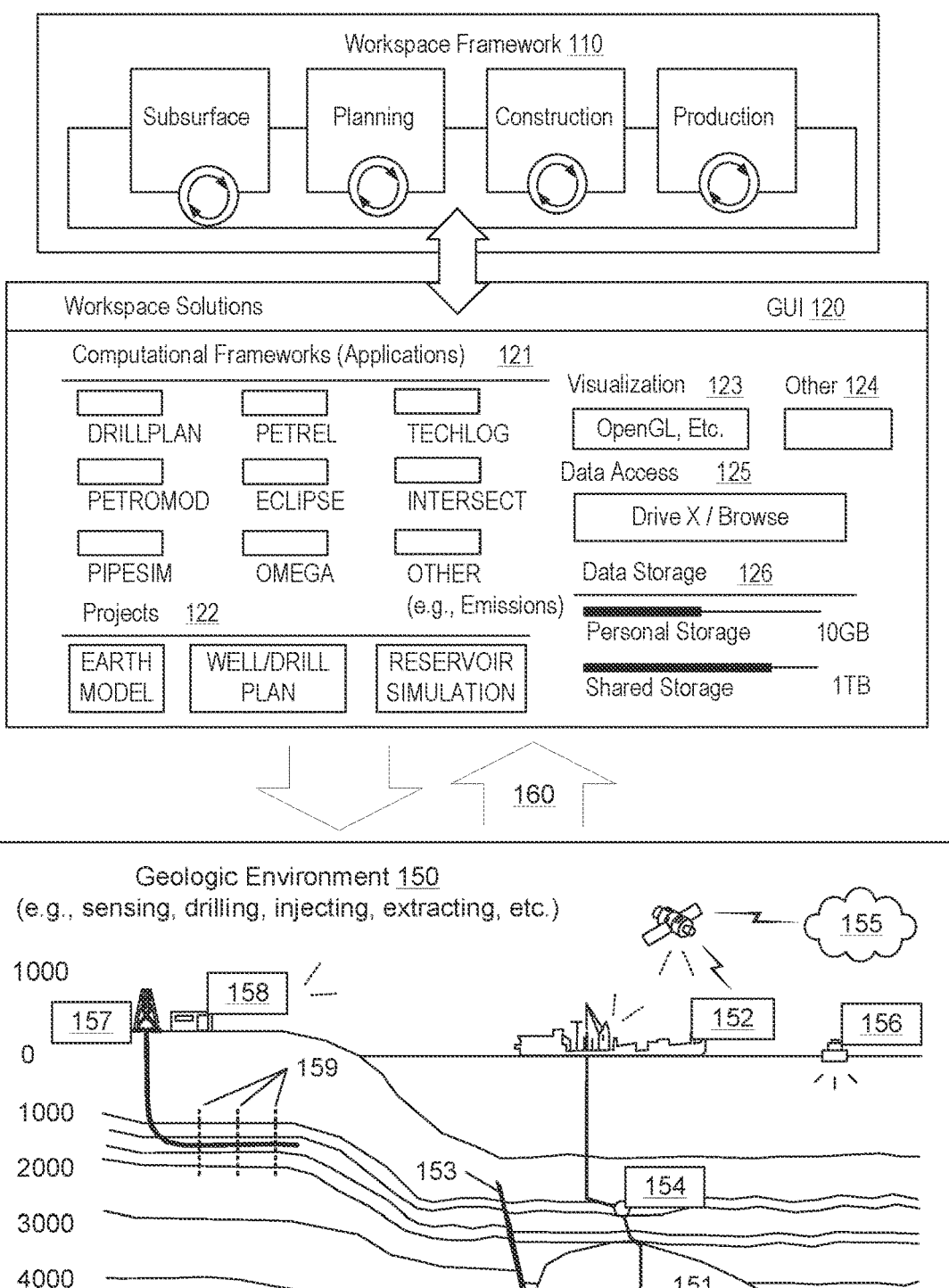
FIG. 1 illustrates an example of a framework and an example of a geologic environment.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization features 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PETROMOD, ECLIPSE, INTERSECT, PIPESIM and OMEGA frameworks (SLB, Houston, Texas). As to another type of framework, consider, for example, an emissions framework (EF), which may be operable in combination with one or more other frameworks to make determinations as to emissions (e.g., of one or more field operations, etc.). In such an example, an EF may provide feedback such that another framework can operate on output of the EF, for example, to revise a plan, revise a control scheme, etc., which may be in a manner that aims to reduce one or more types of emissions and/or other impact from an activity, etc.

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive E&P environment (SLB, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (SLB, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The OMEGA framework includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density. The OMEGA framework also includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools. Various features can be included for processing various types of data such as, for example, one or more of: land, marine, and transition zone data; time and depth data; 2D, 3D, and 4D surveys; isotropic and anisotropic (TTI and VTI) velocity fields; and multicomponent data.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (SLB, Houston, Texas). Such a framework may operatively couple various other frameworks to provide for a multi-framework workspace. As an example, the GUI 120 of FIG. 1 may be a GUI of the DELFI framework.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (SLB, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The MANGROVE simulator (SLB, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

As mentioned, a framework may be implemented within or in a manner operatively coupled to the DELFI cognitive exploration and production (E&P) environment (SLB, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

As mentioned, reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Digital images of a subsurface region of the Earth can be generated using digital seismic data acquired using reflection seismology as part of a seismic survey. A digital image can show subterranean structure, for example, as related to one or more of exploration for petroleum, natural gas, and mineral deposits. As an example, reflection seismology can include determining time intervals that elapse between initiation of a seismic wave at a selected shot point (e.g., the location where an explosion generates seismic waves) and the arrival of reflected or refracted impulses at one or more seismic detectors (e.g., sensing of seismic energy at one or more seismic receivers). As an example, a seismic air gun can be used to initiate seismic waves. As an example, one or more electric vibrators or falling weights (e.g., thumpers) may be employed at one or more sites. Upon arrival at the detectors, the amplitude and timing of seismic energy waves can be recorded, for example, as a seismogram (e.g., a record of ground vibrations).

In various regions of the Earth, the material density (e.g., rock density) increases with depth. Seismic energy waves can be initiated at a shot point (or points) at or near the surface where a portion of the seismic energy, as waves, may reach one or more receiving points. Material properties and structural organization of materials (e.g., as objects, layers, etc.) can affect seismic energy waves in one or more manners. Received seismic energy waves can be utilized to determine one or more types of material properties and/or structural organization of one or more types of materials. As with sound traveling through air or water, seismic energy waves can be attenuated as they pass through subsurface materials, which may include air, water, hydrocarbons, rock, etc. Such attenuation can occur in a manner that is dependent on material properties of such materials.

Interpretation of the depths and media reached by seismic energy waves can depend on geometry of a seismic survey, for example, on the distance between shot points and receiving points, as well as densities of media. Results of a seismic survey may be in digital form (e.g., digital data) as stored in memory of a computing device where display circuitry (e.g., a graphics processor, a video processor, etc.) can render the digital data to a display in the form of a cross-sectional image of subsurface structures as if cut by a plane through the shot point, the detector, and a reference point such as the Earth's center. As an example, digital image processing can involve receiving seismic data as digital data, processing the seismic data via one or more techniques, and rendering processed seismic data to a display as an image of a region of the Earth that can show structural features of the Earth that otherwise are not visible from an observer standing on the surface of the Earth.

A seismic survey can be defined with respect to a region of the Earth and, for example, a manner of acquisition of seismic data. As an example, a survey may be two-dimensional, three-dimensional, four-dimensional, etc. Dimensions include one or more spatial dimensions and optionally one or more temporal dimensions (e.g., repeating a survey for a region at different points in time). As to a 2D survey, a grid may be considered dense if the line spacing (e.g., of receivers) is less than about 400 m. As to a 3D spatial survey, in comparison to a 2D spatial survey, it may help to elucidate true structural dip (e.g., a 2D survey may give apparent dip), it may provide more and better stratigraphic information, it may provide a map view of reservoir properties, it may provide a better areal mapping of fault patterns and connections and delineation of reservoir blocks, it may provide better lateral resolution (e.g., 2D may suffer from a cross-line smearing, or Fresnel zone, problem).

As to data sets, a 3D spatial seismic data set can be a cube or volume of data. As an example, a 2D spatial seismic data set can be a panel of data. To interpret 3D seismic data, a method can process the "interior" of the cube (e.g., seismic cube) using one or more processors of computing equipment. As an example, a 3D seismic data set can range in size from a few tens of megabytes to several gigabytes or more.

As to a 3D seismic cube, a point can have an (x, y, z) coordinate and a data value. A coordinate can be a distance from a particular corner of the cube. A 3D seismic data volume is like a room-temperature example (e.g., where temperature differs in a cube shaped room), however, rather than a height of a room, a height or vertical axis can be in terms of a two-way traveltime, which may be a proxy for depth. In such an example, the 3D seismic cube is still a spatial cube because the data therein correspond to the same survey where, rather than depth, two-way traveltime (TWT) is utilized, which, can be, in general, a proxy for depth. And, in contrast to room-temperature, data values can be seismic amplitudes (e.g., amplitudes of seismic energy waves). A 3D seismic data set can be, for example, a box full of electronically determined numbers where each number represents a measurement (e.g., amplitude of a seismic energy wave, etc.). In a 3D seismic data set, amplitudes may be rendered as data values in the form of one or more images for slices through the 3D seismic data set where, for example, in grayscale, dark and light image bands in the sections are related to rock boundaries.

Reflection seismology can be implemented as a technique that detects "edges" of materials in the Earth. An image generated utilizing reflection seismology can show such edges of materials, which can be equated to positions in the Earth such that one may know where an edge of a material is in the Earth. For example, where the edge corresponds to a hydrocarbon reservoir, a method can include drilling to the reservoir in a manner guided by the position of the edge. As an example, a drilling process can be manual, semi-automated or automated where positional information as to an edge of a material in the Earth can be utilized to guide drilling equipment that forms a bore in the Earth where the bore may be directed to the edge or to a region that is defined at least in part by the edge. Where reflection seismology is improved, such an "edge" may be detected more readily and/or with greater accuracy (e.g., resolution), which, in turn, can improve one or more field processes such as a drilling process.

Figure 2:
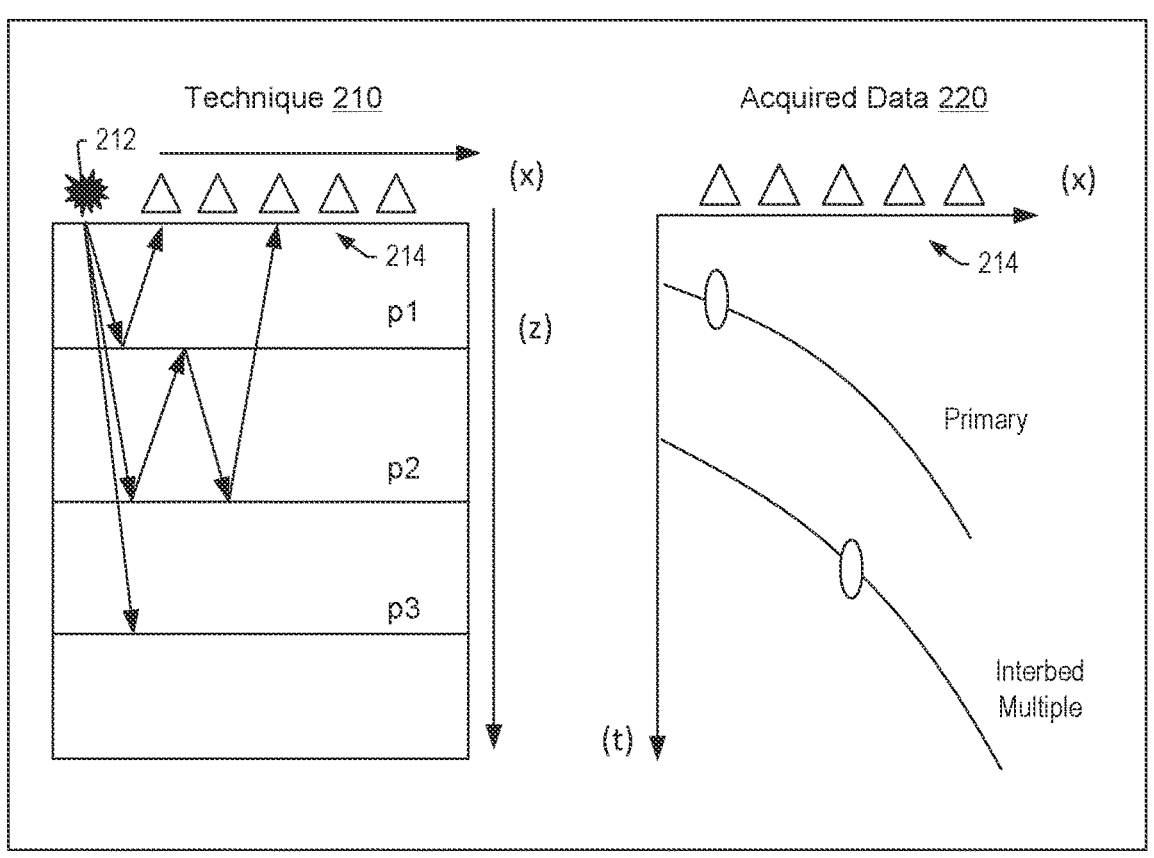
FIG. 2 illustrates examples of signals, an example of a technique and examples of multiple reflections.
Figure 2:
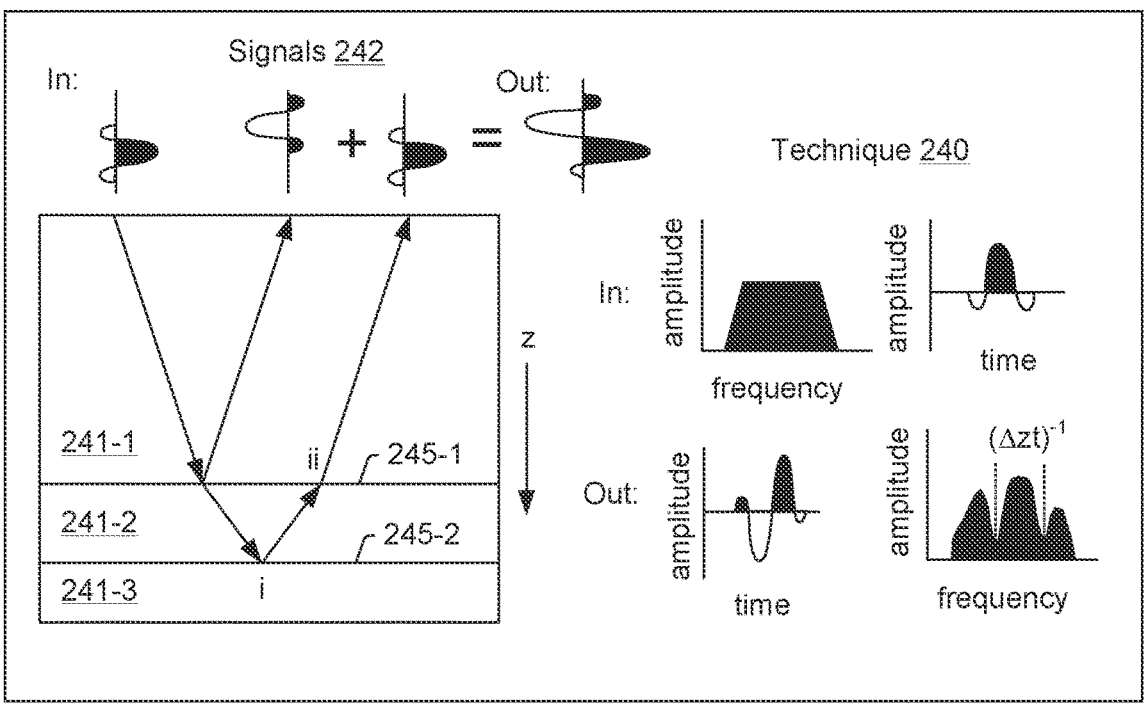

FIG. 2 shows an example of a technique 210 and acquired data 220 and an example of a technique 240 and signals 242. As mentioned, a survey can include utilizing a source or sources and receivers. In the example technique 210, a source 212 is illustrated along with a plurality of receivers 214 that are spaced along a direction defined as an inline direction x. Along the inline direction x, distances can be determined between the source 212 and each of the receivers 214.

A subsurface region being surveyed includes features such as surface and subsurface horizons p1, p2, and p3 where one or more of such structural features can be interfaces where elastic properties can differ such that seismic energy is at least in part reflected. For example, a horizon can be an interface that might be represented by a seismic reflection, such as the contact between two bodies of rock having different seismic velocity, density, porosity, fluid content, etc. In the example of FIG. 2, the technique 210 is shown to generate seismic reflections, which can include singly reflected and multiply reflected seismic energy. The acquired data 220 illustrate energy received by the receivers 214 with respect to time, t, and their inline position along the x-axis. As shown, singly reflected energy can be defined as primary (or primaries) while multiply reflected energy can be defined as multiples such as surface multiples, interbed multiples (e.g., IM), etc.

A primary can be defined as a seismic event whose energy has been reflected once; whereas, a multiple can be defined as an event whose energy has been reflected more than once. With respect to seismic interpretation, whether manual, semi-automatic or automatic, various techniques may aim to enhance primary reflections to facilitate interpretation of one or more subsurface interfaces. In other words, multiples can be viewed as extraneous signal or noise that can interfere with an interpretation process. As an example, one or more methods can utilize multiples to provide useful signals. For example, consider a seismic survey designed to increase seismic signal coverage of a subsurface region of the Earth through use of multiples.

Where multiples are considered undesirable, a process that aims to attenuate the presence of multiples (e.g., the presence of information in seismic data that corresponds to multiple energy) may include an adaptive subtraction process. An adaptive subtraction process can include modeling of multiples to generate a model (e.g., a multiples model) followed by subtracting the model from the acquired data. A technique that can be used for attenuation of multiples may be the extended internal multiple prediction (XIMP), which is a data-driven multiple-modeling approach for prediction of internal multiples from recorded events using wavefield extrapolation, for example, based on the Kirchhoff integral.

In FIG. 2, the technique 240 can include emitting energy with respect to time where the energy may be represented in a frequency domain, for example, as a band of frequencies. In such an example, the emitted energy may be a wavelet and, for example, referred to as a source wavelet which has a corresponding frequency spectrum (e.g., per a Fourier transform of the wavelet).

A wavelet can be a one-dimensional pulse defined by attributes such as, for example, amplitude, frequency and phase. A wavelet can originate as a packet of energy from a source point, having a specific origin in time, and be returned to one or more receivers as a series of events distributed in time and energy. The distribution is a function of velocity and density changes in the subsurface and the relative position of the source and receiver. Energy that returns cannot exceed what was input, so the energy in a received wavelet decays with time, for example, as more partitioning takes place at interfaces. Wavelets can also decay due to loss of energy as heat during propagation, which can be more extensive at higher frequencies. In various instances, received wavelets can tend to contain less high-frequency energy relative to low frequencies at longer traveltimes. Some wavelets are known by their shape and spectral content, such as the Ricker wavelet (e.g., a zero-phase wavelet such as the second derivative of the Gaussian function or the third derivative of the normal-probability density function).

As an example, a geologic environment may include layers 241-1, 241-2 and 241-3 where an interface 245-1 exists between the layers 241-1 and 241-2 and where an interface 245-2 exists between the layers 241-2 and 241-3. As illustrated in FIG. 2, a wavelet may be first transmitted downward in the layer 241-1; be, in part, reflected upward by the interface 245-1 and transmitted upward in the layer 241-1; be, in part, transmitted through the interface 245-1 and transmitted downward in the layer 241-2; be, in part, reflected upward by the interface 245-2 (see, e.g., "i") and transmitted upward in the layer 241-2; and be, in part, transmitted through the interface 245-1 (see, e.g., "ii") and again transmitted in the layer 241-1. In such an example, signals (see, e.g., the signals 242) may be received as a result of wavelet reflection from the interface 245-1 and as a result of wavelet reflection from the interface 245-2. These signals may be shifted in time and in polarity such that addition of these signals results in a waveform that may be analyzed to derive some information as to one or more characteristics of the layer 241-2 (e.g., and/or one or more of the interfaces 245-1 and 245-2). For example, a Fourier transform of signals may provide information in a frequency domain that can be used to estimate a temporal thickness (e.g., $\Delta zt$) of the layer 241-2 (e.g., as related to acoustic impedance, reflectivity, etc.).

As explained, interbed multiple signals may be received by one or more receivers over a period of time in a manner that acts to "sum" their amplitudes with amplitudes of other signals. In such an example, the additional interbed signals may interfere with an analysis that aims to determine one or more characteristics of the layer 241-2 (e.g., and/or one or more of the interfaces 245-1 and 245-2). For example, interbed multiple signals may interfere with identification of a layer, an interface, interfaces, etc. (e.g., consider an analysis that determines temporal thickness of a layer, etc.).

Figure 3:
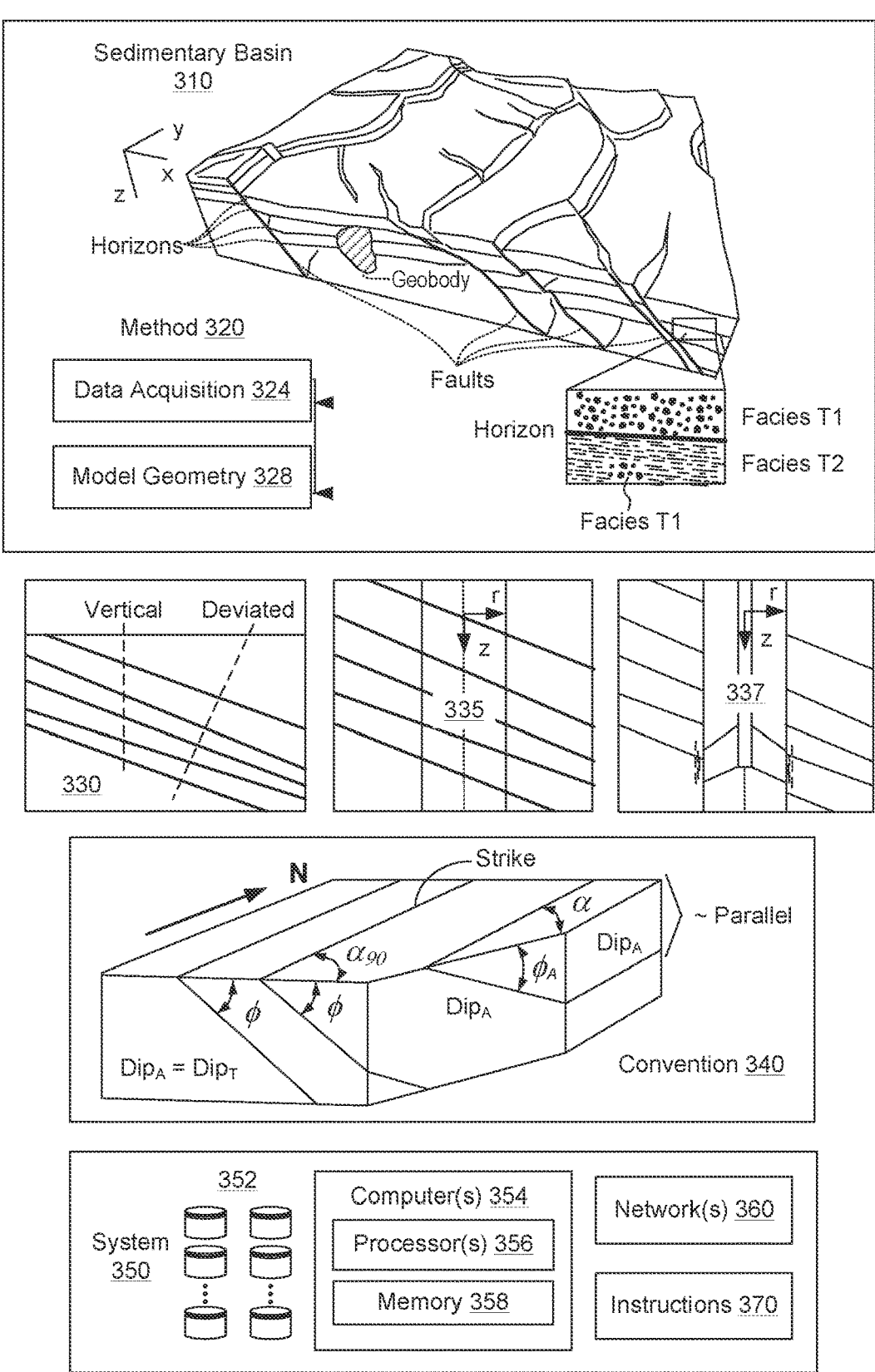
FIG. 3 illustrates examples of an environment, an example of a method and an example of a convention.

FIG. 3 shows an example of a sedimentary basin 310 (e.g., a geologic environment), an example of a method 320 for model building (e.g., for a simulator, etc.), an example of a formation 330, an example of a borehole 335 in a formation, an example of a convention 340 and an example of a system 350.

As an example, data acquisition, reservoir simulation, petroleum systems modeling, etc. may be applied to characterize various types of subsurface environments, including environments such as those of FIG. 1.

In FIG. 3, the sedimentary basin 310, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 320 includes a data acquisition block 324 and a model geometry block 328. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

As shown in FIG. 3, the formation 330 includes a horizontal surface and various subsurface layers. As an example, a borehole may be vertical. As another example, a borehole may be deviated. In the example of FIG. 3, the borehole 335 may be considered a vertical borehole, for example, where the z-axis extends downwardly normal to the horizontal surface of the formation 330. As an example, a tool 337 may be positioned in a borehole, for example, to acquire information. As mentioned, a borehole tool may be configured to acquire electrical borehole images. As an example, the fullbore Formation MicroImager (FMI) tool (SLB, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

As an example, data can include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by SLB (Houston, Texas). As an example, a LITHO SCANNER tool may be a gamma ray spectroscopy tool.

As an example, a borehole may be vertical, deviated and/or horizontal. As an example, a tool may be positioned to acquire information in a horizontal portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the TECHLOG framework (SLB, Houston, Texas).

As to the convention 340 for dip, as shown, the three-dimensional orientation of a plane can be defined by its dip and strike, which can be considered to be types of orientation information (e.g., structural orientation information). Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 340 of FIG. 3, various angles ø indicate angle of slope downwards, for example, from an imaginary horizontal plane (e.g., flat upper surface); whereas, dip refers to the direction towards which a dipping plane slopes (e.g., which may be given with respect to degrees, compass directions, etc.). Another feature shown in the convention of FIG. 3 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 340 of FIG. 3). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 340 of FIG. 3). Apparent dip may be the dip of a plane as measured in any other direction except in the direction of true dip (see, e.g., $\phi_A$ as Dip for angle $\alpha$); however, it is possible that the apparent dip is equal to the true dip (see, e.g., $\phi$ as $Dip_A=Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 340 of FIG. 3, the dip of a plane as seen in a cross-section perpendicular to the strike is true dip (see, e.g., the surface with ø as $Dip_A=Dip_T$ for angle $\alpha_{90}$ with respect to the strike). As indicated, dip observed in a cross-section in any other direction is apparent dip (see, e.g., surfaces labeled $Dip_A$). Further, as shown in the convention 340 of FIG. 3, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation and borehole azimuth) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 340 may be used with respect to an analysis, an interpretation, an attribute, etc. (e.g., consider a PETREL seismic-to-simulation framework workflow, etc.). As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 3, the system 350 includes one or more information storage devices 352, one or more computers 354, one or more networks 360 and one or more sets of instructions 370. As to the one or more computers 354, each computer may include one or more processors (e.g., or processing cores) 356 and memory 358 for storing instructions, for example, executable by at least one of the one or more processors. As an example, a computer may include one or more network interfaces (e.g., wired or wireless), one or more graphics cards, a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 352.

As an example, the one or more sets of instructions 370 may include instructions stored in memory and accessible to one or more of the one or more processors 356 in a manner that allows for execution thereof by such of one or more processors 356 to instruct the system 350 to perform various actions. As an example, the system 350 may be configured such that the one or more sets of instructions 370 provide for establishing the framework or a portion thereof. As an example, one or more methods, techniques, etc. may be performed using one or more sets of instructions, which may be, for example, one or more of the one or more sets of instructions 370 of FIG. 3.

As mentioned, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than 1 Hz and/or optionally more than 100 Hz). Seismic data may be processed and interpreted, for example, to understand better composition, fluid content, extent and geometry of subsurface rocks.

Figure 4:
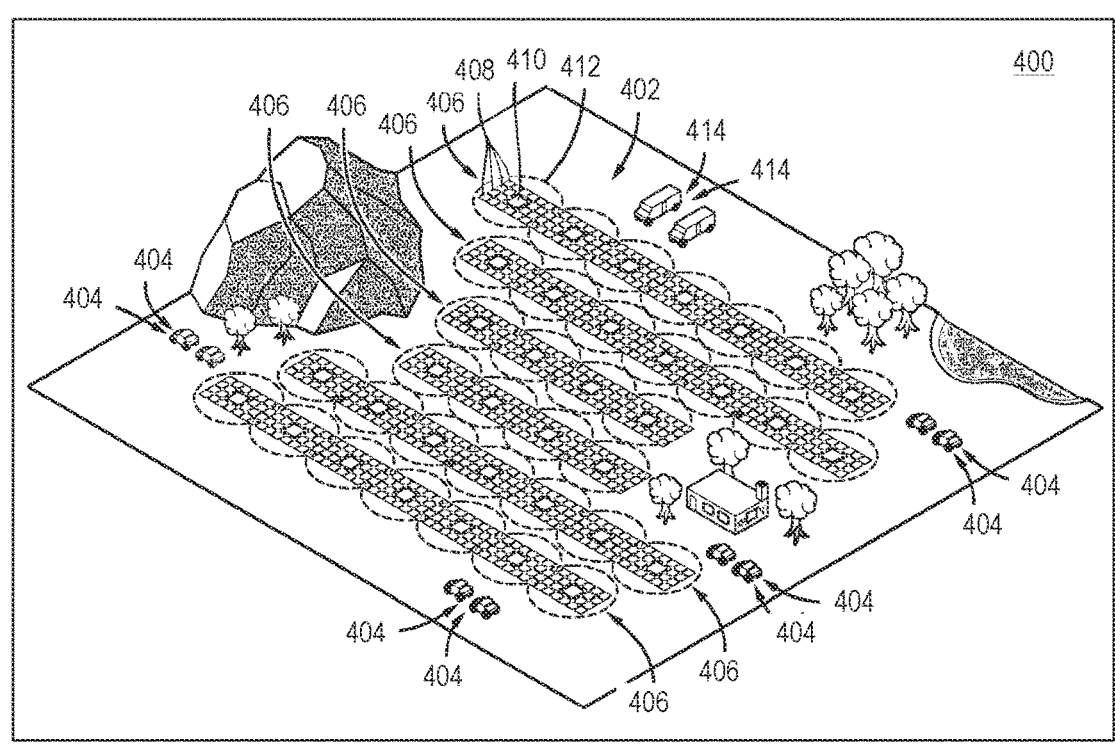
FIG. 4 illustrates examples of survey techniques.
Figure 4:
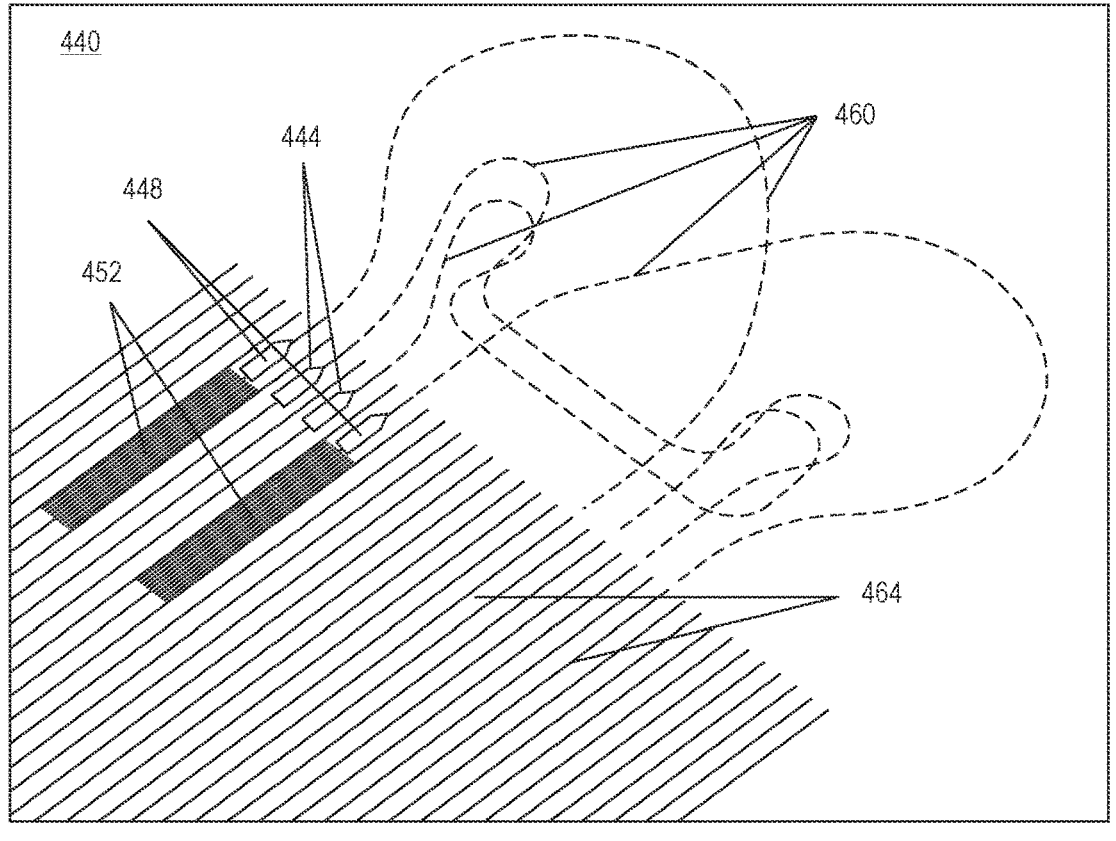

FIG. 4 shows an example of a simplified schematic view of a land seismic data acquisition system 400 and an example of a simplified schematic view of a marine seismic data acquisition system 440.

As shown with respect to the system 400, an area 402 to be surveyed may or may not have physical impediments to direct wireless communication between a recording station 414 (which may be a recording truck) and a vibrator 404. A plurality of vibrators 404 may be employed, as well as a plurality of sensor unit grids 406, each of which may have a plurality of sensor units 408.

As illustrated in FIG. 4 with respect to the system 400, approximately 24 to about 28 sensor units 408 may be placed in a vicinity (a region) around a base station 410. The number of sensor units 408 associated with each base station 410 may vary from survey to survey. Circles 412 indicate an approximate range of reception for each base station 410.

In the system 400 of FIG. 4, the plurality of sensor units 408 may be employed in acquiring and/or monitoring land-seismic sensor data for the area 402 and transmitting the data to the one or more base stations 410. Communications between the vibrators 404, the base stations 410, the recording station 414, and the seismic sensors 408 may be wireless (at least in part via air for a land-based system; or optionally at least in part via water for a sea-based system).

In the system 440 of FIG. 4, one or more source vessels 444 may be utilized with one or more streamer vessels 448 or a vessel or vessels may tow both a source or sources and a streamer or streamers 452. In the example of FIG. 4, the vessels 444 and 448 (e.g., or just the vessels 448 if they include sources) may follow predefined routes (e.g., paths) for an acquisition geometry that includes inline and crossline dimensions. As shown, routes 460 can be for maneuvering the vessels to positions 464 as part of the survey (e.g., consider survey lines). As an example, a marine seismic survey may call for acquiring seismic data during a turn (e.g., during one or more of the routes 460).

The example systems 400 and 440 of FIG. 4 demonstrate how surveys may be performed according to an acquisition geometry that includes dimensions such as inline and cross-line dimensions, which may be defined as x and y dimensions in a plane or surface where another dimension, z, is a depth dimension. As explained, time can be a proxy for depth, depending on various factors, which can include knowing how many reflections may have occurred as a single reflection may mean that depth of a reflector can be approximated using one-half of a two-way traveltime, some indication of the speed of sound in the medium and positions of the receiver and source (e.g., corresponding to the two-way traveltime).

Two-way traveltime can be defined as the elapsed time for a seismic wave to travel from its source to a given reflector and return to a receiver (e.g., at a surface, etc.). As an example, a minimum two-way traveltime can be defined to be that of a normal-incidence wave with zero offset.

As an example, a seismic survey can include points referred to as common midpoints (CMPs). In multichannel seismic acquisition, a CMP is a point that is halfway between a source and a receiver that is shared by a plurality of source-receiver pairs. In such a survey, various angles may be utilized that may define offsets (e.g., offsets from a CMP, etc.). In a CMP approach, redundancy among source-receiver pairs can enhance quality of seismic data, for example, via stacking of the seismic data. A CMP can be vertically above a common depth point (CDP), or common reflection point (CRP).

As an example, a seismic survey can include points referred to as downward reflection points (DRPs). A DRP is a point where seismic energy is reflected downwardly. For example, where multiple interfaces exist, seismic energy can reflect upwardly from one interface, reach a shallower interface and then reflect downwardly from the shallower interface. Referring to FIG. 2, the technique 210 is illustrated with p2 being deeper than p1 such that a DRP exists along p1.

As an example, a seismic survey may be an amplitude variation with offset (AVO) survey. Such a survey can record variation in seismic reflection amplitude with change in distance between position of a source and position of a receiver, which may indicate differences in lithology and fluid content in rocks above and below a reflector.

AVO analysis can allow for determination of one or more characteristics of a subterranean environment (e.g., thickness, porosity, density, velocity, lithology and fluid content of rocks, etc.). As an example, gas-filled sandstone might show increasing amplitude with offset; whereas, a coal might show decreasing amplitude with offset. AVO analysis can be suitable for young, poorly consolidated rocks, such as those in the Gulf of Mexico.

As an example, a method may be applied to seismic data to understand better how structural dip may vary with respect to offset and/or angle as may be associated with emitter-detector (e.g., source-receiver) arrangements of a survey, for example, to estimate how suitable individual offset/angle gathers are for AVO imaging. A gather may be a collection of seismic traces that share an acquisition parameter, such as a common midpoint (CMP), with other collections of seismic traces. For example, consider an AVO survey that includes a plurality of emitter-detector arrangements (e.g., source-receiver pairs) with corresponding angles defined with respect to a common midpoint (CMP). Given a CMP, acquired survey data may be considered to cover a common subsurface region (e.g., a region that includes the midpoint).

As an example, a method can include taking into account one or more considerations of offset and/or reflection point(s) for primaries and for multiples where, for example, one or more considerations may differ for a primary or primaries compared to a multiple or multiples. As mentioned, factors such as angles can differ for multiples as well as reflection point(s), as a multiple is associated with more than one reflection point. Such factors can be utilized to improve imaging, for example, by filling in a primary coverage gap, more closely approaching an object (e.g., a geobody), more closely approach an obstruction, etc.

As to a formation that is anisotropic, use of multiples may provide information that can be utilized to determine or otherwise characterize anisotropy. For example, anisotropy may be better characterized where information is acquired at one or more particular angles. In such an example, an angle of a multiple may be associated with energy passing through a layer of material in a manner that can elucidate type of anisotropy or, for example, having seismic data for more angles that provided by primaries alone can help to elucidate anisotropy. Anisotropy can be a variation of a property of a material with the direction in which it is measured. In rocks, variation in seismic velocity measured parallel and perpendicular to bedding surfaces can be indicative of anisotropy. However, in a seismic survey, angles directly parallel and directly perpendicular may not be readily available. As an example, use of one or more multiples may help to enhance angle coverage. As an example, certain types of multiples may be associated with a layer of material for which anisotropy is to be better understood. As an example, one or more multiples may be selected that are for seismic energy that passes multiple times through a layer, whether on a receiver side, a source side or a receiver side and a source side. As an example, a layer of material can include one or more platy minerals such as micas and clays that tend to align parallel to depositional bedding as sediments are compacted; noting that anisotropy tends to exist in various shales.

As an example, a multiple model of multiples models may be utilized for one or more purposes. For example, consider multiple attenuation where energy (e.g., signal) of various multiples is to be reduced. As another example, consider multiple analysis where a multiples model or multiples models may be analyzed for information that they may include (e.g., with respect to depth, acquisition quality, acquisition footprint, acquisition arrangement, structures, anisotropy, etc.).

Figure 5:
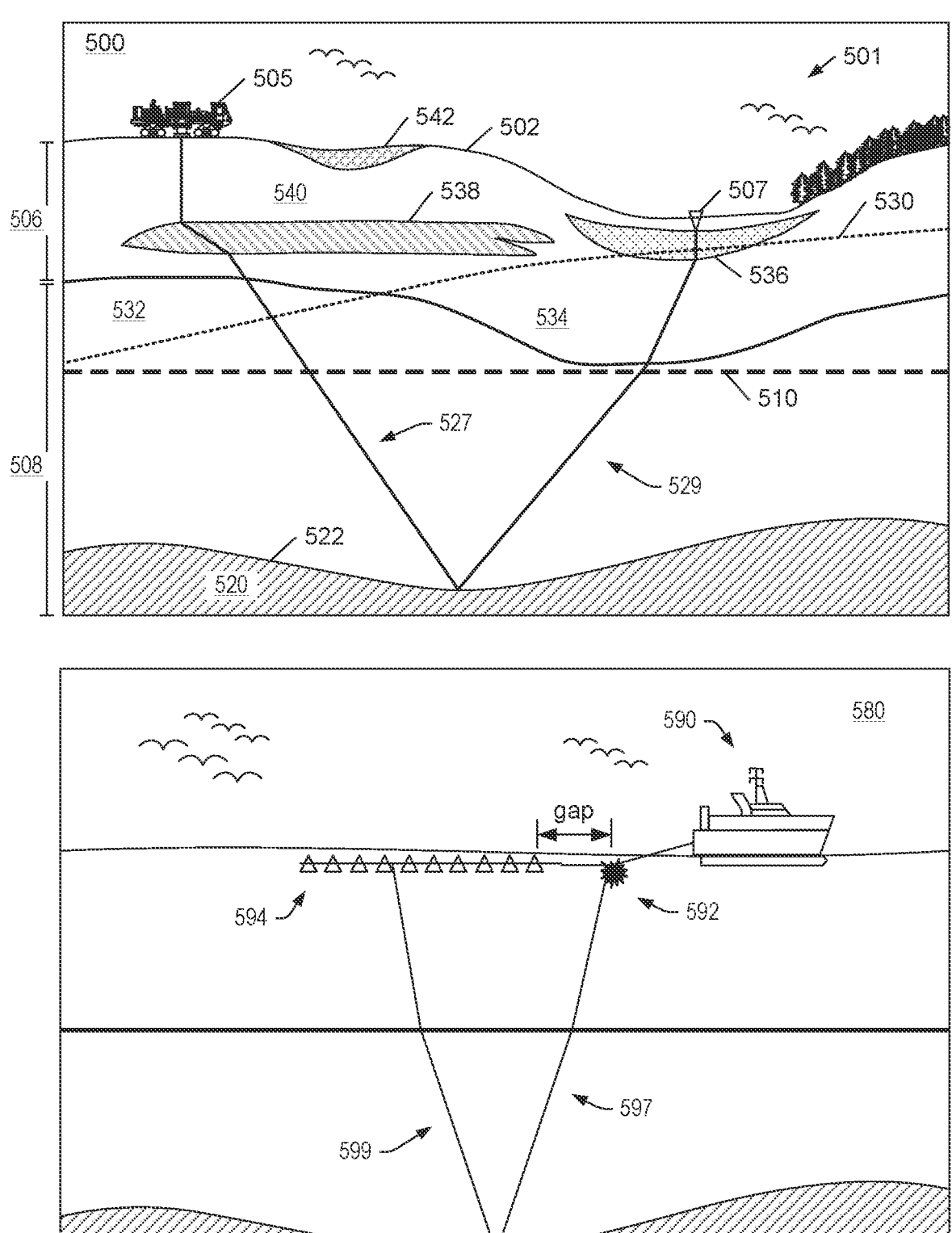
FIG. 5 illustrates examples of survey techniques.

FIG. 5 shows an example of a land system 500 and an example of a marine system 580. The land system 500 is shown in a geologic environment 501 that includes a surface 502, a source 505 at the surface 502, a near-surface zone 506, a receiver 507, a bedrock zone 508 and a datum 510 where the near-surface zone 506 (e.g., near-surface region) may be defined at least in part by the datum 510, which may be a depth or layer or surface at which data above are handled differently than data below. For example, a method can include processing seismic data that aims to "place" the source 505 and the receiver 507 on a datum plane defined by the datum 510 by adjusting (e.g., "correcting") traveltimes for propagation through the near-surface region (e.g., a shallower subsurface region).

In the example system 500 of FIG. 5, the geologic environment 501 can include various features such as, for example, a layer 520 that defines an interface 522 that can be a reflector, a water table 530, a leached zone 532, a glacial scour 534, a buried river channel 536, a region of material 538 (e.g., ice, evaporates, volcanics, etc.), a high velocity zone 540, and a region of material 542 (e.g., Eolian or peat deposits, etc.).

In FIG. 5, the land system 500 is shown with respect to downgoing rays 527 (e.g., downgoing seismic energy) and upgoing rays 529 (e.g., upgoing seismic energy). As illustrated the rays 527 and 529 pass through various types of materials and/or reflect off of various types of materials.

Various types of seismic surveys can contend with surface unevenness and/or near-surface heterogeneity. For example, a shallow subsurface can include large and abrupt vertical and horizontal variations that may be, for example, caused by differences in lithology, compaction cementation, weather, etc. Such variations can generate delays or advances in arrival times of seismic waves passing through them relative to waves that do not. By accounting for such time differences, a seismic image may be of enhanced resolution with a reduction in false structural anomalies at depth, a reduction in mis-ties between intersecting lines, a reduction in artificial events created from noise, etc.

As an example, a method can include adjusting for such time differences by applying a static, or constant, time shift to a seismic trace where, for example, applying a static aims to place a source and receiver at a constant datum plane below a near-surface zone. As an example, an amount by which a trace is adjusted can depend on one or more factors (e.g., thickness, velocity of near-surface anomalies, etc.).

In FIG. 5, the datum 510 is shown, for example, as a plane, below which strata may be of particular interest in a seismic imaging workflow (e.g., a target region of a seismic survey). In a three-dimensional model of a geologic environment, a near surface region may be defined, for example, at least in part with respect to a datum. As an example, a velocity model can be a single dimensional model or a multidimensional model that provides a spatial distribution of velocity in a subsurface environment. For example, consider a model that uses constant-velocity units (layers), through which ray paths obeying Snell's law can be traced. Acoustic impedance and velocity are related such that a model (e.g., acoustic impedance and/or velocity) can be utilized for forward modeling and inversion (e.g., inverting).

In the example of FIG. 5, the source 505 can be a seismic energy source such as a vibrator. As an example, a vibrator may be a mechanical source that delivers vibratory seismic energy to the Earth for acquisition of seismic data. As an example, a vibrator may be mounted on a vehicle (e.g., a truck, etc.). As an example, a seismic source or seismic energy source may be one or more types of devices that can generate seismic energy (e.g., an air gun, an explosive charge, a vibrator, etc.).

Vibratory seismic data can be seismic data whose energy source is a vibrator that may use a vibrating plate to generate waves of seismic energy. As an example, the frequency and the duration of emitted energy can be controllable, for example, frequency and/or duration may be varied according to one or more factors (e.g., terrain, type of seismic data desired, etc.).

As an example, a vibrator may emit a linear sweep of a duration that is of the order of seconds (e.g., at least seven seconds, etc.), for example, beginning with high frequencies and decreasing with time (downsweeping) or going from low to high frequency (upsweeping); noting that variations may be used (e.g., consider a random approach). As an example, frequency may be changed (e.g., varied) in a nonlinear manner (e.g., certain frequencies are emitted longer than others, etc.). In various vibrator scenarios, resulting source wavelet can be one that is not impulsive. As an example, parameters of a vibrator sweep can include start frequency, stop frequency, sweep rate and sweep length.

As an example, a vibrator may be employed in land acquisition surveys for areas where explosive sources may be contraindicated (e.g., via regulations, etc.). As an example, more than one vibrator can be used simultaneously (e.g., in an effort to improve data quality, etc.).

As an example, a receiver may be a UniQ sensor unit (SLB, Houston, Texas). As an example, a sensor unit can include a geophone, which may be configured to detect motion in a single direction. As an example, a geophone may be configured to detect motion in a vertical direction. As an example, three mutually orthogonal geophones may be used in combination to collect so-called 3C seismic data. As an example, a sensor unit that can acquire 3C seismic data may allow for determination of type of wave and its direction of propagation. As an example, a sensor assembly or sensor unit may include circuitry that can output samples at intervals of 1 ms, 2 ms, 4 ms, etc. As an example, an assembly or sensor unit can include an analog to digital converter (ADC) such as, for example, a 24-bit sigma-delta ADC (e.g., as part of a geophone or operatively coupled to one or more geophones). As an example, a sensor assembly or sensor unit can include synchronization circuitry such as, for example, GPS synchronization circuitry with an accuracy of about plus or minus 12.5 microseconds. As an example, an assembly or sensor unit can include circuitry for sensing of real-time and optionally continuous tilt, temperature, humidity, leakage, etc. As an example, an assembly or sensor unit can include calibration circuitry, which may be self-calibration circuitry.

Referring again to the geologic environment 501, multiples can be generated via various interfaces where such multiples may be of different types, orders, modes, etc. The geologic environment 501 illustrates how an environment may differ with respect to depth as well as some issues that may arise with respect to imaging of shallower depths.

In FIG. 5, the system 580 includes equipment 590, which can be a vessel that tows one or more sources 592 and one or more streamers (e.g., with receivers 594). In the system 580, a source or sources 592 of the equipment 590 can emit energy at a location and a receiver or receivers 594 of the equipment 590 can receive energy at a location. The emitted energy can be at least in part along a path of the downgoing energy 597 and the received energy can be at least in part along a path of the upgoing energy 599. As an example, a marine source may be a single shot type of source, an array of sources, etc. As an example, a marine source may be configured as a continuous source, akin to a land survey vibrator.

In various systems, for one or more reasons, a gap in coverage may exist. For example, in the system 580 a gap is identified and labeled where the gap may be defined as a distance between a seismic source and a seismic receiver. In such an example, the distance may be considered a practical or a safe distance for locating a seismic receiver from a seismic source. If a seismic receiver is too close to a seismic source, the seismic receiver may experience a rather large shock wave and/or may otherwise experience energy that may be quite high and raise concerns with calibration, dynamic range, etc.

In the examples of FIG. 5, the paths are illustrated as single reflection paths for sake of simplicity. In the environments illustrated, additional interactions, reflections can be expected. For example, ghosts may be present. A ghost can be defined as a short-path multiple, or a spurious reflection that occurs when seismic energy initially reverberates upward from a shallow subsurface and then is reflected downward, such as at the base of weathering or between sources and receivers and the sea surface. As an example, the equipment 590 can include a streamer that is configured to position receivers a distance below an air-water interface such that ghosts can be generated where upgoing energy impacts the air-water interface and then reflects downward to the receivers. In such an example, a process may be applied that aims to "deghost" seismic data. Deghosting can be applied to marine seismic survey data where such a process aims to attenuate signals that are downgoing from an air-water interface (i.e., sea surface interface). As mentioned, one or more other techniques, technologies, etc., may be utilized for seismic surveying (e.g., ocean bottom cables (OBC), ocean bottom nodes (OBN), etc.). For example, a source or sources may be towed and fired while OBCs and/or OBNs include receivers that can sense emitted source energy (e.g., as may be reflected from one or more target region structures, etc.).

Some examples of techniques that can process seismic data include migration and migration inversion, which may be implemented for purposes such as structural determination and subsequent amplitude analysis. In seismic exploration, signal can be defined as a part of a recorded seismic record (e.g., events) that is decipherable and useful for determining subsurface information (e.g., relevant to the location and production of hydrocarbons, etc.). Migration and migration inversion are techniques that can be used to extract subsurface information from seismic reflection data.

As an example, a migration technique can include predicting a coincident source and receiver at depth at a time equal to zero; an approach that may be extended for heterogeneous media and to accommodate two-way propagation in a local sense at points from the source to a target reflector and back from the reflector to the receiver and in a global sense, separately for each of the two legs from the source to the reflector and from the reflector to the receiver. Such an approach for two-way wave propagation migration may provide for quantitative and definitive definition of the roles of primaries and multiples in migration where, for example, migration of primaries can provide subsurface structure and amplitude information.

Various techniques that can be used to predict a wavefield inside a volume from (measured) values of a field on a surface surrounding the volume involve Green's theorem. Green's theorem may be implemented, for example, as part of a process for a finite volume model prediction of the so-called "source and receiver experiment" for two-way waves at depth. As an example, Green's theorem can predict a wavefield at an arbitrary depth z between a shallower depth "a" and a deeper depth "b".

Figure 6:
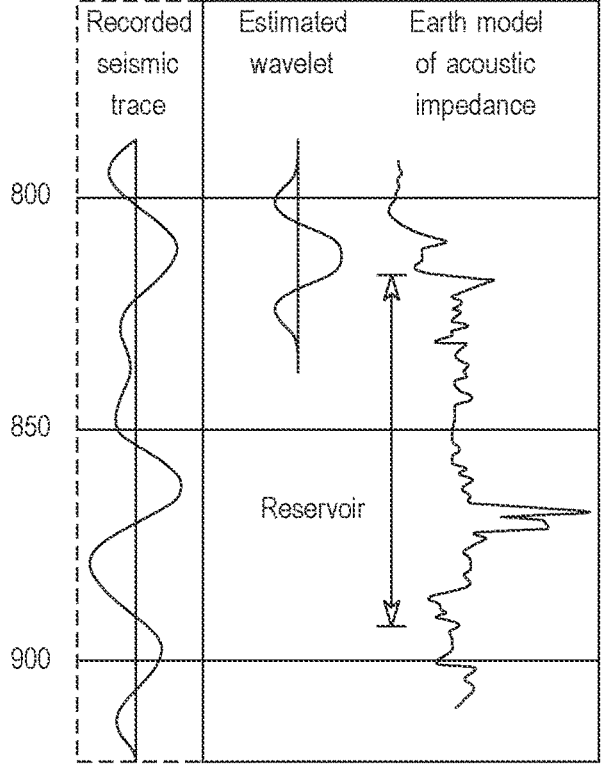
FIG. 6 illustrates examples of techniques.

FIG. 6 shows an example of forward modeling 610 and an example of inversion 630 (e.g., an inversion or inverting). As shown, the forward modeling 610 progresses from an earth model of acoustic impedance and an input wavelet to a synthetic seismic trace (e.g., a simulated seismic trace) while the inversion 630 progresses from a recorded seismic trace to an estimated wavelet and an earth model of acoustic impedance. As an example, forward modeling can take a model of formation properties (e.g., acoustic impedance as may be available from well logs) and combine such information with a seismic wavelength (e.g., a pulse) to output one or more synthetic seismic traces while inversion can commence with a recorded seismic trace, account for effect(s) of an estimated wavelet (e.g., a pulse) to generate values of acoustic impedance for a series of points in time (e.g., depth).

Acoustic impedance is the opposition of a medium to a longitudinal wave motion. Acoustic impedance is a physical property whose change determines reflection coefficients at normal incidence, that is, seismic P-wave velocity multiplied by density. Acoustic impedance characterizes the relationship between the acting sound pressure and the resulting particle velocity.

During the propagation of seismic wave along a ray path, a seismic wave transmits through or reflects at a material boundary and/or converts its vibration mode between P-wave and S-wave. An observed amplitude of a seismic wave depends on an acoustic impedance contrast at a material boundary between an upper medium and a lower medium. Acoustic impedance, Z, can be defined by a multiplication of density, $\rho$, and seismic velocity, Vp, in each media. Acoustic impedance Z tends to be proportional to Vp for the many sedimentary and crustal rocks (e.g., granite, anorthite, pyrophyllite, and quartzite), except for some ultramafic rocks (e.g., dunite, eclogite, and peridotite) in the mantle.

As mentioned, for one or more reasons, data may be lacking, high in noise, unreliable, etc. In the example of FIG. 5, the system 580 can have a physical gap that results in less data or no data in a particular subsurface region. In such a scenario, one or more techniques may be applied to synthesize data for the particular subsurface region. Where data are too noisy (e.g., low SNR), one or more processing techniques may be applied to improve the data, augment the data and/or replace the data with synthetic data. As an example, an approach to data improvement may include using one or more models, which may include one or more machine learning models (ML models) and/or one or more other types of models.

Where data are missing, insufficient, problematic, etc., and one or more data improvement techniques applied, such techniques can be less than "real". For example, interpolated data, model data, etc., for a region can deviate from real data for the region where the real data represents the actual subsurface region. Where an inversion is performed, deviations can result in artifacts where such artifacts can confound understanding of the subsurface region. For example, artifacts may confound interpretation of structure such as one or more horizons (e.g., reflectors) in the subsurface region. Where an earth model is built using such data, as may be inverted for interpretation, the earth model may be inaccurate. Where such an earth model is utilized for simulating physical phenomena (e.g., fluid flow, geomechanics, acoustic energy, etc.), simulation results may include inaccuracies, some of which may be physical and cause problems with convergence of iterative simulation solvers. For example, an artifact may give rise to an earth model that has something unnatural such that continuity equations that describe physical phenomena do not readily converge or converge. Such problems can waste time and resources. For example, a system of equations that does not readily converge may take a longer time to provide simulation results where more iterations may result in an increase in digital errors (e.g., round-off errors, etc.). As such, earth models are to be as accurate as possible. When an earth model is built using seismic data, techniques that can improve the seismic data and/or improve inversion of the seismic data can improve earth model building and a built earth model.

In various instances, an inversion problem may be ill-posed for one or more reasons. As explained, recorded data can include discrepancies including, for example, missing near offsets (e.g., due to gaps, etc.), and multiple events with other artifacts that contaminate the model of primaries that is inverted for. Artifacts can also be associated with inversion inaccuracies coming from inaccurate physics simulation, e.g., inversion of 3D data using 2D inversion, wavelet estimation errors, etc.

Figure 7:
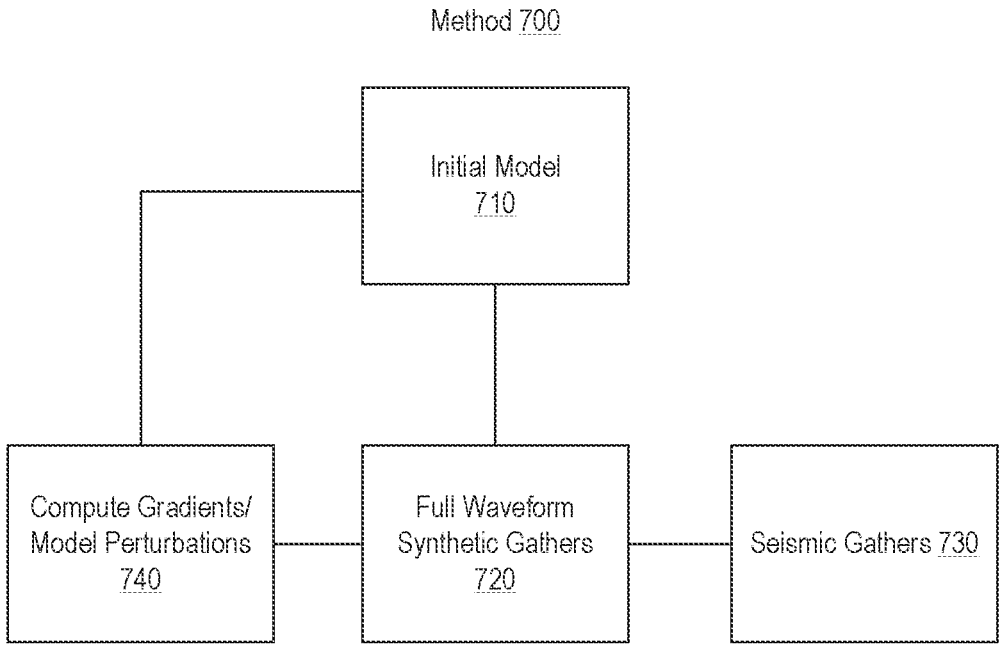
FIG. 7 illustrates an example of a method.

FIG. 7 shows an example of a method 700 that can perform a full waveform inversion (FWI). As shown, the method 700 includes a block 710 for an initial model, a block 720 for generation of full waveform synthetic gathers, a block 730 for seismic gathers, and a block 740 for computation of gradients and/or model perturbations. In the method 700, comparisons can be made between the synthetic gathers and the seismic gathers (e.g., as acquired in the field, etc.) such that improvements can be made to an initial model and, via iteration, to subsequent model versions until acceptable convergence is achieved. As explained, where one or more types of data quality issues exist for seismic gathers, an inversion technique can be less than optimal. In various instances, convergence may be less than optimal such that more iterations occur, which consumes more time and/or computational resources. And, with quality issues, the final model (e.g., inversion result) can be subject to inaccuracies. As explained, a final model can be the basis for simulation(s) and where the final model includes inaccuracies such inaccuracies can impact simulation, whether convergence of iterative simulations and/or simulation results. Quality control of actual data can be time consuming and/or resource intensive; noting that seismic data can include volumetric data (e.g., a seismic volume), which may be of the order of terabytes in size. As an example, a method can be implemented that can automate at least a portion of quality control such that an inversion can be more robust and/or generate an improved model, which, in turn, can provide for improved results from one or more subsequent processes, techniques, etc.

In general, FWI for seismic reservoir characterization can be summarized as including the following: a reservoir model, physics, forward modeling, and an inversion engine. As explained, such components are interlinked. For instance, the desired reservoir model drives the physics which then subsequently governs the development of forward modeling. As to forward modeling, a numerical technique such as the finite-difference (FD) method may be utilized (e.g., as for wavefield extrapolation, etc.); however, the FD method can be affected by numerical dispersion as the frequency bandwidth increases, forcing use of finer-sampled grids, which subsequently increases the computational cost. Cost can become increasingly high for anisotropic and elastic wave modelling owing to the spatial variations of the velocity field. For one or more such reasons, high-resolution FWI remains challenging in reservoir characterization.

As explained, a method can provide for automated decision making for full waveform inversion (FWI). As an example, such a method may be implemented as a feature (e.g., components, tool, etc.) of a framework such as, for example, the OMEGA framework.

Automation of decision making in a FWI workflow can provide for improved performance and results. Such an approach can provide a thorough analysis of various meaningful features of a seismic wavefield, providing assurance in the quality of results.

As explained, FWI involves iteratively updating an earth model such that the difference between observed seismic data and the data predicted by that earth model is minimized. FWI can involve the use of thousands to tens of thousands of seismic gathers, and the predicted data for those gathers is generated for tens to hundreds of iterations or more.

The high volume of observed data and predicted data (e.g., synthetic data) makes quality control (QC) of the process quite challenging, which in turn makes it difficult to make the best decision at one or more stages in the process. Some QCs involve creating subsets of the data for manual inspection at various points in the process, or alternatively generating intermediate imaging products (e.g., such as migrated seismic volumes, or common image point gathers) based on the current updated model.

Manual QC of subsets of data is challenging because the user cannot inspect every piece of data at every point in the process. The user has to choose when and where to QC the data, and then decide on an appropriate action to take. QC via generating intermediate imaging products involves time consuming workflows and is generally not efficient as it again demands user interpretation and intervention for remedial action.

As an example, a method can help to streamline and/or reduce actions and interventions by making automated decisions to assure quality of results, which can thereby improve further workflows (e.g., identification of hydrocarbons, placement of wells, drilling trajectories, hydraulic fracturing operations, etc.). Automated analysis of data can be performed for each shot at each iteration if so desired, for example, matching meaningful features of the predicted and observed wavefields, which can include exploiting the sampled dimensions of the wavefield, its directionality (dip content), phase, and temporal-frequency content. As an example, attributes can include attributes selected from one or more libraries. As an example, attributes can include polarity, amplitude variation with angle and/or offset, and/or one or more other multi-component attributes. As an example, for an OBC survey, polarity may be considered and/or amplitude variation with angle and/or offset.

As an example, a method can include distinguishing guided and/or Scholte waves. Acquisition of Scholte waves and acoustic guided waves can be performed, for example, in shallow marine environments. For example, consider a stationary receiver method using ocean bottom hydrophone and seismometer stations (OBH/OBS) that can produce common-receiver-gathers of a moving source, while towed acquisition with a fixed source and streamer configuration records conventional shot-gathers. An acoustic guided wave can be concentrated in a water column and decay exponentially with depth in an elastic medium below. It can be understood as constructively interfering P-wave energy totally reflected at the sea-bottom and reverberated in the shallow water layer. Interface waves propagating along the free surface of a solid material can be termed Rayleigh waves. In a shallow marine environment, the water layer tends to have little influence on wave energy at low frequencies. At higher frequencies the amplitude of the P-SV polarized wave tends to be the largest near the fluid-solid interface and referred to as a Scholte wave. As mentioned, one or more of various attributes may be utilized to distinguish guided waves and Scholte waves where such waves may be appropriately handled, for example, for purposes of quality control, etc.

Features can be represented by a set of attributes that provide complementary measures of the distance between the predicted and observed data. Such attributes can then be used to classify data according to one or more set criteria. As an example, each class can be designed to represent different ways in which current predicted data are supported by observed data. As an example, classes may be designed to represent information that is useable by one or more methods of full waveform inversion (FWI), for example, using a least squares objective function, a travel-time objective function, etc.

As an example, different classes can be used to automatically select (or weight) data prior to a next iteration, that is, a method can automatically intervene to act on an automated analysis in a way that would not be practical for a user to do manually. In such an example, an inversion can be augmented through use of an automatic decision-making framework that can assist the inversion in a manner that improves a final result (e.g., a final model). An intervention may involve using a mask to select data that fall into one or more classes, may involve applying different weightings to different classes, may involve automated selection of the most appropriate objective function to use, combination of different objective functions within the same data, etc. Such an approach allows a FWI to be optimized according to the set criteria, allowing for faster convergence towards a better updated earth model (e.g., with less user interaction).

One or more of different strategies may be used for FWI. For example, if the starting model for the inversion generates data that are close enough to the observed data, such that the chosen objective function generates reliable updates, then the full seismic record can be used for the inversion process. Advances in approaches that lessen the constraints on the starting model may make the full seismic record approach more feasible for a wider range of projects.

In other cases where the starting model does not generate data that are close enough, then one or more different strategies that use a manual selection process that aims to provide the most useable information to the inversion may be used. These strategies may involve defining a portion of the data to select for the inversion, proceeding with the inversion until the user is satisfied with the results, and then defining an enlarged portion of the data for the next round of inversion, such that more information is provided to drive the model updates. In this way the user can attempt to provide the inversion with the most useable information available in the current step. In such an example, a user may kick-start an inversion whereby automated decision making can follow, as appropriate, to improve a final result of the inversion.

In various scenarios, there can be different strategies that can be followed for a manual data selection process where a challenge can exist in identifying which strategy is best suited for a current project. Where handled manually, this can involve time consuming analysis and design of data masking/windowing operators. For example, an approach that first focusses on the first arrival data, before expanding the selection to include diving waves and wide-angle reflection can be time consuming. Another approach that aims to overcome a basic starting model by using a strategy of manual windowing around the direct arrival, with the window getting progressively larger as the inversion proceeds can be time consuming. As an example, a method can provide for recommending one or more manual strategies that can aim to expedite inversion, optionally where one or more automated approaches can be implemented to thereby reduce manual intervention.

In various instances, inversion using a full record may be more appealing; as provided the starting model is sufficient, there may not necessarily be a demand for an attempt to design a bespoke data selection strategy such that a process may become more automated, with potentially less user interaction. As an example, a method can allow a full record to be input to an inversion, and through automation, provide the benefit of selecting (e.g., at each step in the process, etc.), those parts of the full record that carry the most useable information. Such an approach may be hierarchical and/or tiered where, for example, the parts with the most useable information are selected as a top tier followed by parts of lesser useable information, as may be optionally tailored for one or more purposes.

As to various types of automated data selection strategies, some aim to avoid cycle-skipped parts of the data, implement an adaptive data selection strategy based on travel-time differences to eliminate cycle skipping, or implement a data selection strategy to avoid cycle skipping based on a weighting function derived from a local similarity metric. One or more of such approaches may be implemented in combination with one or more of various other approaches, which may be implemented alone.

As an example, a method can include first extracting meaningful features of predicted and observed wavefields (e.g., including not just time-delays, but exploiting one or more of sampled dimensions of a wavefield, its directionality, phase, temporal-frequency content, etc.). In such an example, the method can combine multiple attributes representing features to identify different classes of data, for example, corresponding to different types of objective functions, which can then be used to make automatic decisions.

Figure 8:
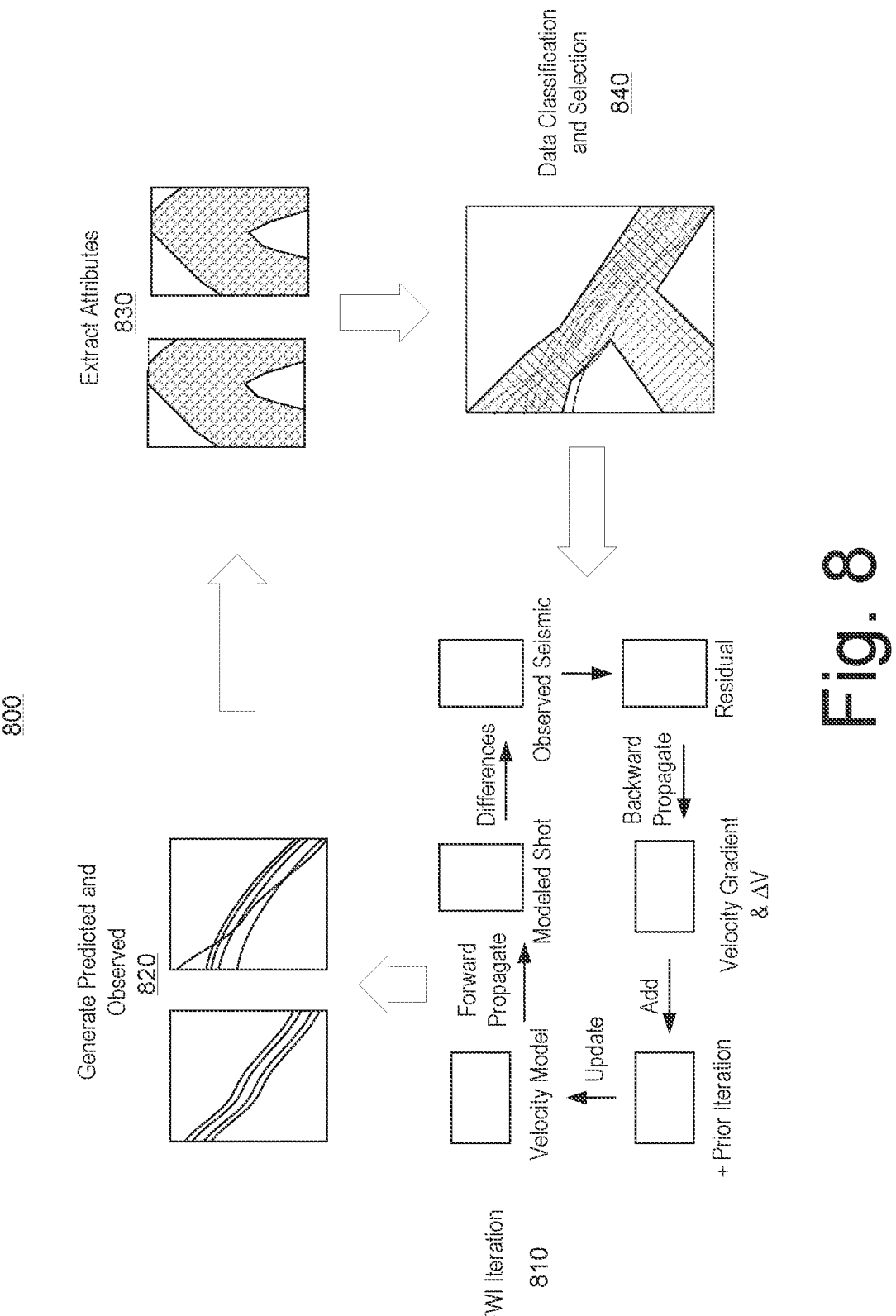
FIG. 8 illustrates an example of a method.

FIG. 8 shows an example of a method 800 where, for example, for each gather and at each iteration of a FWI 810, a set of volumetric attributes 830 can be extracted from predicted and/or observed data 820. As shown, the attributes 830 can be used to classify the data 840, before using such classification(s) to make automatic decisions pertaining to the FWI 810.

As an example, at a given point in the FWI 810, predicted and observed data 820 can be generated for selected input gathers. In general, such gathers may be used to generate a residual that is back propagated in a next iteration (e.g., which may include application of a user specified data selection strategy). In the example method 800, automatic QC can be implemented for each of these gathers by generating a set of volumetric attributes 830 representing how similar (or dissimilar) the different parts of the data are. In the example of FIG. 8, the attributes 830 represent meaningful features of the predicted and observed wavefields 820 (e.g., including not just time-delays, but exploiting the sampled dimensions of the wavefield, such as, for example, one or more of its directionality, phase, and temporal-frequency content). In the example of FIG. 8, the data may be classified 840 based on a combination of multiple attributes.

As an example, automated decision making can take the form of a selection of the data applied according to one or more of different classes of data. For example, such a selection can also applied to a residual prior to back propagation. In such an approach, the method 800 provides for simplicity of the full record inversion (e.g., no bespoke selection strategy required), but through automation, which provides the benefit of selecting those parts of the data that carry the most useable information.

Figure 9:
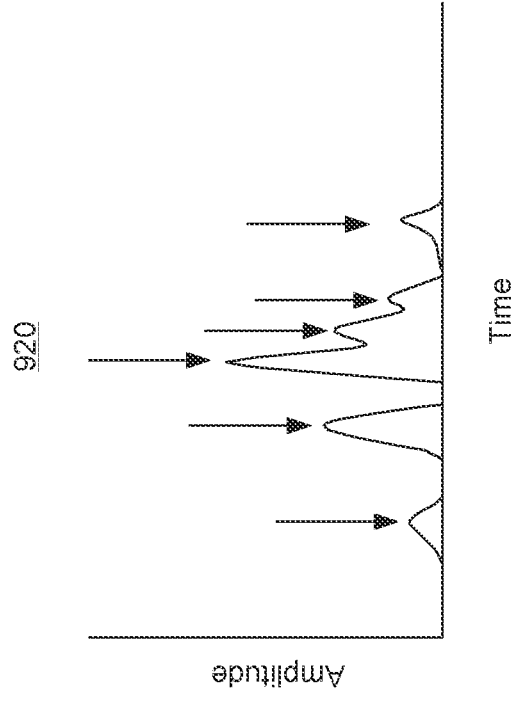
FIG. 9 illustrates examples of plots.
Figure 9:
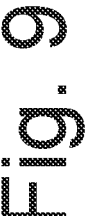
Figure 9:
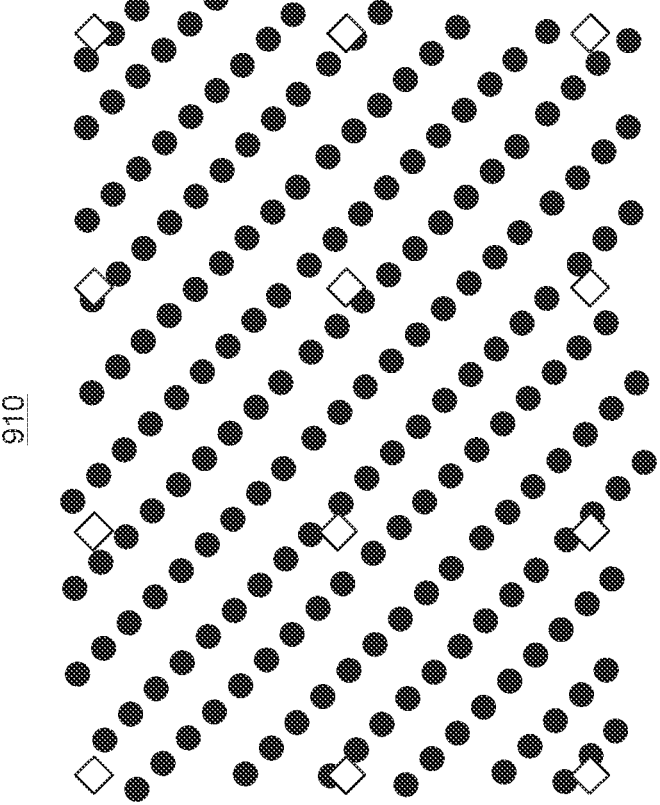

FIG. 9 shows example plots 910 and 920 where the plot 910 shows a uniform 1D or 2D grid (diamonds) defined covering trace locations (dots) and where the plot 920 shows events that are identified in time by computing the envelope of the nearest predicted trace to each grid location.

FIG. 9 illustrates an example of how attributes may be generated, for example, via a uniform spatial grid covering the trace locations for the current gather where, for example, for each grid point, the closest trace can be selected, and peaks identified in the predicted data for that trace location (e.g., by using the envelope function of that trace as shown in the plot 920). Such an approach provides candidate predicted events that can be used to evaluate against the observed data.

As an example, a time and space window can be chosen around each candidate event, before computing the attributes that represent the meaningful features of the predicted and observed events. In such an example, for each event, the dominant dip (direction of propagation) of the predicted and observed data can be identified. In such an example, a method can then determine the distance between the two closest dips, which provides a metric of how closely the predicted and observed data are matching in terms of spatial structure.

Figure 10:
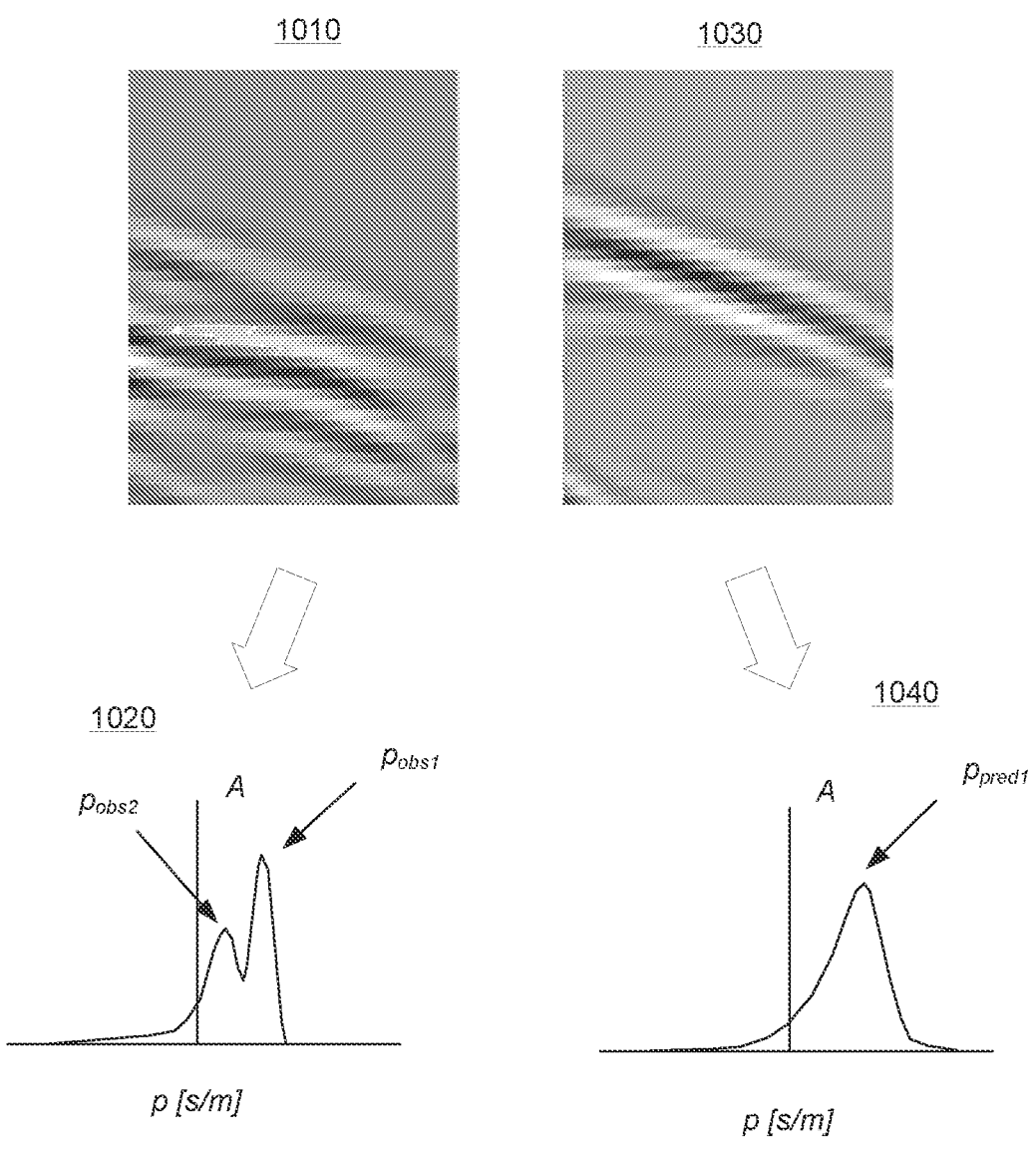
FIG. 10 illustrates examples of images and plots.

FIG. 10 shows example images 1010 and 1030 and example plots 1020 and 1040. In FIG. 10, once a set of events are identified, a window can be extracted around an event for both observed (1010 and 1020) and predicted (1030 and 1040) data. As shown in the plot 1020, two observed events can be identified, $p_{obs1}$ and $p_{obs2}$, while in the plot 1040, a single event is identified $p_{pred1}$. In such an example, the data can then be decomposed into the dominant slowness components (dips) and the closest matching dips identified.

In FIG. 10, the image 1010 and the plot 1020 pertain to a window around a selected event in the observed data and the image 1030 and the plot 1040 pertain to the same for the predicted data. In this 2D example, the slowness spectra can be computed for both observed and predicted data, and the dominant slowness can be detected, for example, using an iterative matching pursuit approach. In the example of FIG. 10, two dominant events are identified in the observed data, with a single dominant event identified in the predicted data. The distance between the two closest dips can then be the absolute value of the difference between $p_{obs1}$ and $p_{pred1}$. For 3D data (e.g., when data are acquired with dense source or receiver carpets), both inline and crossline dips can be estimated to honor the dimensionality of the wavefield.

Figure 11:
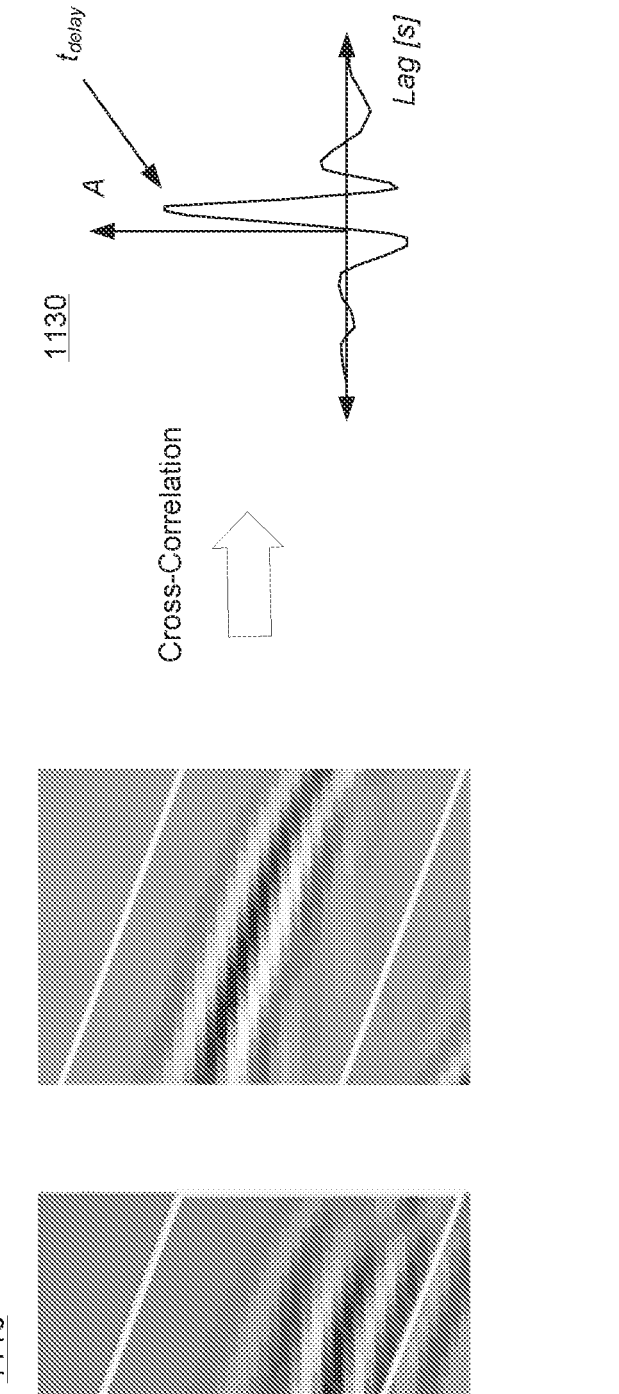
FIG. 11 illustrates examples of images and a plot.

FIG. 11 shows example images 1110 and 1120 and an example plot 1130. In the example of FIG. 11, the data are windowed again, using a window that follows the dominant dip in the predicted data in images 1110 and 1120 (see, e.g., yellow box sketched for illustration). Using this new window, dip-guided time delays can be computed by cross-correlation as shown in the plot 1130 (see, e.g., time delay $t_{delay}$).

As explained with respect to FIG. 11, a method can window data again, such that the window follows the dominant dip extracted from the predicted data. In FIG. 11, within this dipping window, a method can compute the cross-correlations between predicted and observed data (e.g., images 1110 and 1120) and, for example, use the mean (e.g., across traces) of those cross-correlations to determine the dip-guided time shift between the predicted and observed data.

As an example, a method can then define different classes of data based on such attributes. For example, a method may define different classes based on different objective functions. As to some examples, consider:

A least squares objective class based on the candidate events passing the criteria of having closely matching dips and time-delays within half a period of the inversion frequency.

A travel-time objective class based on the candidate events passing the criteria of having closely matching dips and time-delays within the maximum allowable time-delay (which may be a user define parameter, or a default value such as two periods of the inversion frequency).

As an example, one or more other classes may be defined for one or more other objective functions as appropriate.

As an example, a method can provide for data selection based on such different classes. For example, if an inversion is using a least squares objective function, a method can select the data in the least squares objective class. Such a selection can be performed, for example, by masking out the events that are not in the class, and/or by downweighing those events. As explained, a tiered and/or hierarchical approach may be applied.

Figure 12:
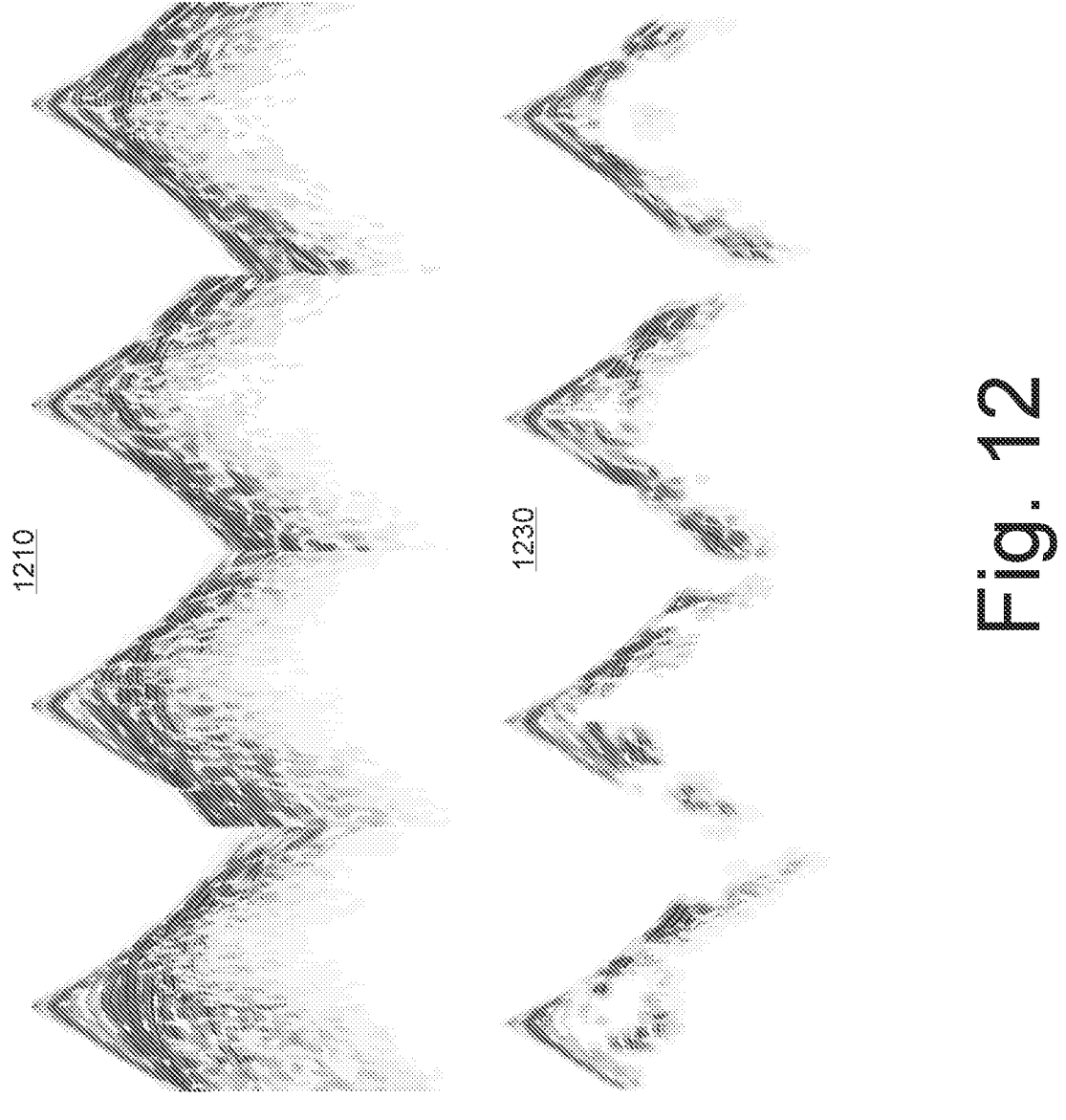
FIG. 12 illustrates examples of images.

FIG. 12 shows example images 1210 and 1230 of gathers where the image 1210 shows observed data shots from Marmousi data and where the image 1230 shows data resulting from automatic selection of events meeting the criteria for a least-squares objective function. The Marmousi data are from the Marmousi model, which was built to resemble an overall continental drift geological setting where numerous large normal faults were created as a result of this drift. The geometry of Marmousi is based somewhat on a profile through the North Quenguela through the Cuanza basin (Africa/African coast).

The example of FIG. 12 shows how masking/selection may be implemented. For example, with a selection of gathers from the observed data, masking can be applied to select those events in a least squares objective class. While FIG. 12 pertains to an example that utilizes a least squares objective function, a method can provide the ability to define one or more criteria related to one or more parameters of one or more other FWI techniques. As explained, a method can provide the ability to make more automatic decision around FWI strategy, for example, selection of the most appropriate objective function at a given stage in a project.

As a further example, rather than applying masking to select data corresponding to a single class, masking can be applied independently for different objective function classes, for example, with the masked residuals combined such that the most appropriate objective function is used for each event within the same gather. For example, for events in a gather where there is no cycle skipping, a least-squares objective function can be used, and for other events in the gather where there is cycle skipping, a travel-time objective function can be used.

As an example, a method can use data selection to automate decisions inside an inversion process. As an example, consider the Marmousi 2D synthetic data, and choosing a starting model for the inversion that causes convergence issues in the left half of the model. As an example, a method can include one or more classification tools that can be trained and/or developed using actual data and/or synthetic data. The original Marmousi data set consists of 240 shots with 96 traces per shot; however, various approaches can augment such data, for example, using the Marmousi model and/or a revised version thereof.

Figure 13:
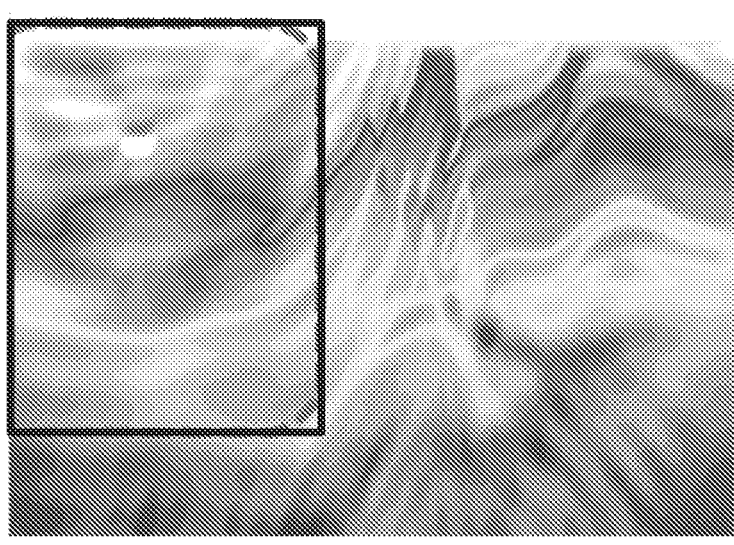
FIG. 13 illustrates examples of models.
Figure 13:
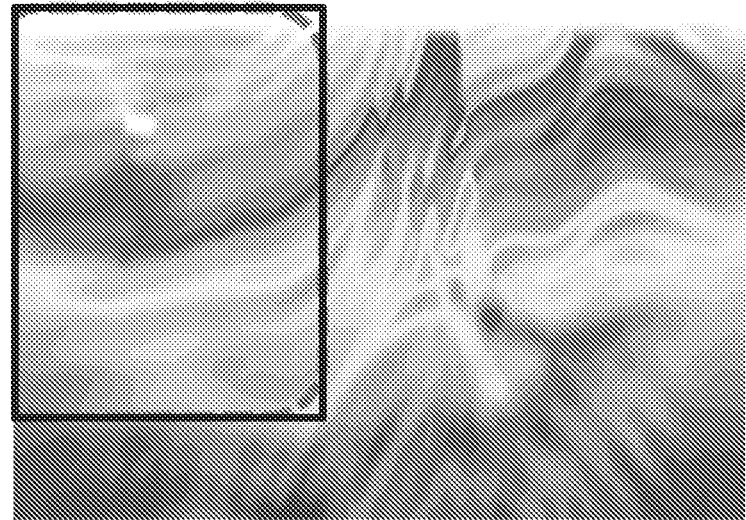

FIG. 13 shows example results of velocity models 1310 and 1330. In the example of FIG. 13, 3 Hz inversion frequency final velocity models are shown for the full record after 20 iterations (see the velocity model 1310) and for data selection with masking after 20 iterations (see the velocity model 1330). The velocity model 1310 is a result from running 20 iterations of conventional least squares full waveform inversion using the full record for 114 input shots; whereas, the velocity model 1330 is an improved result from utilizing an automated quality control method.

In particular, the velocity model 1330 is from performing the same inversion as for the velocity model 1310, however, with computation of QC attributes, and identifying the data within a least squares objective class for each shot at each iteration where a data selection mask is then computed and applied at each iteration before back propagation.

In the examples of FIG. 13, boxes show the part of the model where the starting model presents challenges. For the inversion without the automated QC, the starting model generates information that is not useable by the least squares inversion (e.g., noting that it may be cycle skipped). For the inversion with automated QC, one or more portions of data are identified where their influence is reduced to allow for better model updates to be generated, which can be seen by the substantial difference in the final velocity model 1330 within the box. As can be discerned, the velocity model 1330 is an improved velocity model when compared to the velocity model 1310.

As an example, to provide assurance on the quality of results, a method can include using an automated selection to update a model in such a way that one or more parts of the model causing issues are gradually improved. In such an example, at some point, cycle-skipped events are shifted to be not-cycle-skipped such that they can contribute positively to a model update.

Figure 14:
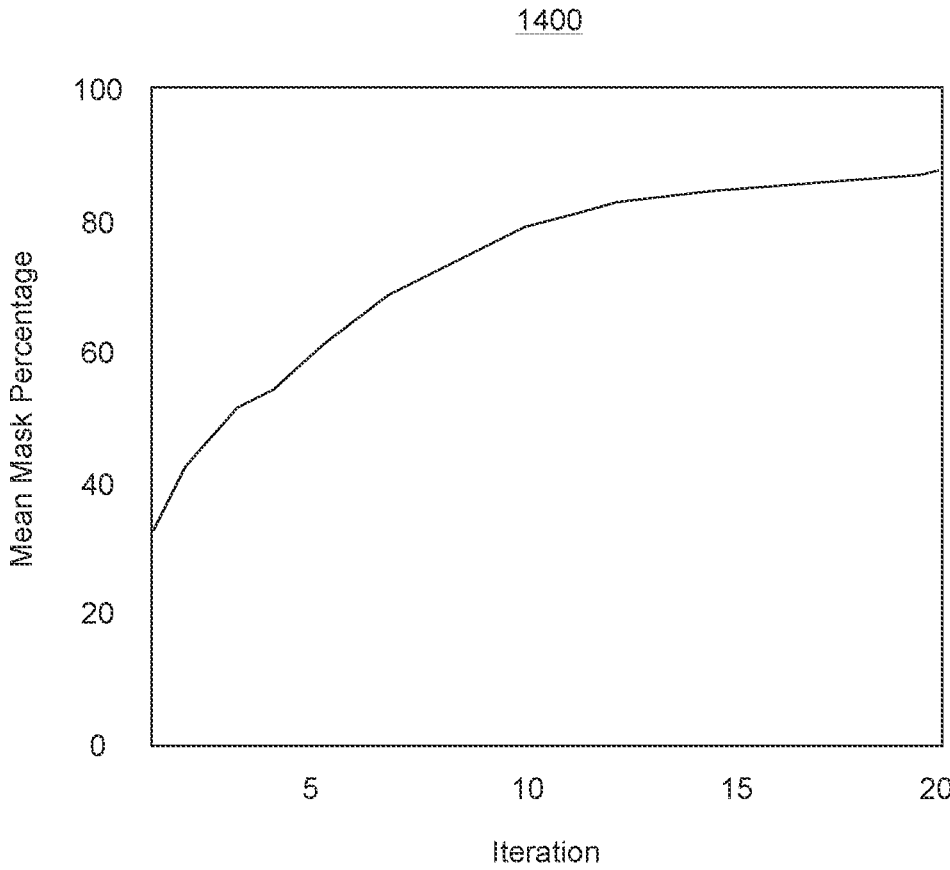
FIG. 14 illustrates an example of a plot.

FIG. 14 shows an example plot 1400 as to percentage of data passing the selection criteria for the data selection by a masking workflow. In the plot 1400, the percentage of events falling into the least squares classification at each iteration is shown. As the model updates at each iteration, more and more of the candidate events pass this criterion and a method can provide one or more confidence indicators that the model updates are proceeding in a suitable direction. For example, if a selected region does not grow, this can be an indicator that the starting model does not support enough of the observed data for the particular approach to proceed. As explained, a recommendation may be generated for improving a starting model, which may provide for automated improvement and/or manual improvement. In such an example, an improved starting model may facilitate inversion where such an inversion can be guided via an automated quality control framework to ultimately generate an improved final result.

As explained, various attributes may be utilized for purposes of quality control, decision making, etc. For example, consider dip and time delay attributes examples of two attributes that may be used. As an example, one or more other attributes may be used to represent meaningful features of a wavefield including, for example, one or more of correlation coefficients, matching filters, coherency, dynamic time warping attributes, etc. Processes such as robust linear algebra may be used for attribute calculation, for example, to make a process more robust in the presence of noise.

As an example, automatic data selection may have an impact on measured misfit and decisions taken relating to it. As an example, by computing the misfit in a selected region, a method can provide for measuring the misfit in the region where the misfit is most likely to improve, which may be more indicative of how the process is converging. As the selection will change from iteration-to-iteration, the misfit can be adjusted to account for such behavior. For example, consider a method that includes normalizing the misfit by energy contained within a mask, etc.

As an example, data selection can be used as part of a line search to find a step length for model updates at each iteration. In such an example, a line search can more appropriately focus on selected parts of the data, which in turn can potentially provide a more appropriate step length for the update. Additionally, by using the size of the selected region as a penalty on the misfit, the line search can be used to find the step length that attempts to both minimize the misfit and maximize the growth of the mask. As an example, a method can include normalization of the misfit by the energy in the mask as one such penalty.

As an example, automatic selection may be used to steer a wavelet inversion process, for example, where closely matching parts of the data can be selected to drive the update of the source wavelet.

As an example, as well as using the data selection to automatically intervene in the FWI process, such an approach can be used in a diagnostic mode. For example, consider an approach that includes creating an output set of shots for visualization with data selection applied. In such an example, a user may manually and/or semi-automatically inspect the shot data to see which parts of the data currently meet one or more criteria for that objective function. As an example, a user may wish to investigate the impact of the data selection on a gradient (e.g., to see the impact of the "non-matching" data on the gradient, etc.). In such an example, the non-matching parts of the data may be selected as an additional diagnostic, etc.

As an example, in a FWI project, an inversion can start from a lower frequency band, and to move towards higher frequencies as the earth model improves. In such an example, a decision can be made as to when to change the frequency band. However, if the change is made too soon, results at the higher frequencies can be degraded, but if the change is made too late, unnecessary costs can be incurred in making more iterations. As an example, an approach for automated decision making can involve extending a set of QC metrics such that it is possible to predict how well the predicted and observed data match at the next frequency band of interest. For example, as criteria based on travel-time are frequency dependent, a method can introduce additional classes that correspond to cut-offs for the next frequency band. If the frequency range is to be doubled, then the cycle skipping cut-off can be halved, and a prediction of which events passing the least-squares criteria at the next frequency band can be made. Once the percentage of events passing one or more criteria passes a threshold, the inversion program can automatically switch to this next bandwidth.

In various examples, classifications and decisions can be based on setting thresholds. However, as an example, an alternative can involve use of one or more techniques from machine learning, such as, for example, classification or clustering techniques, to derive one or more thresholds from data. For example, an unsupervised clustering technique may be implemented to group QC data into different clusters, with each cluster labeled corresponding to a distribution of values. In such an example, these labelled clusters can then be used in a project to define different classes of interest. As an example, such labelled clusters may be used to refine one or more decision making processes for one or more future projects, for example, by using the labeled clusters as input to train a supervised learning workflow that can identify at which point a decision is to be made. As explained, actual data and/or synthetic data may be utilized in a machine learning approach, which may be a supervised approach and/or unsupervised approach.

Figure 15:
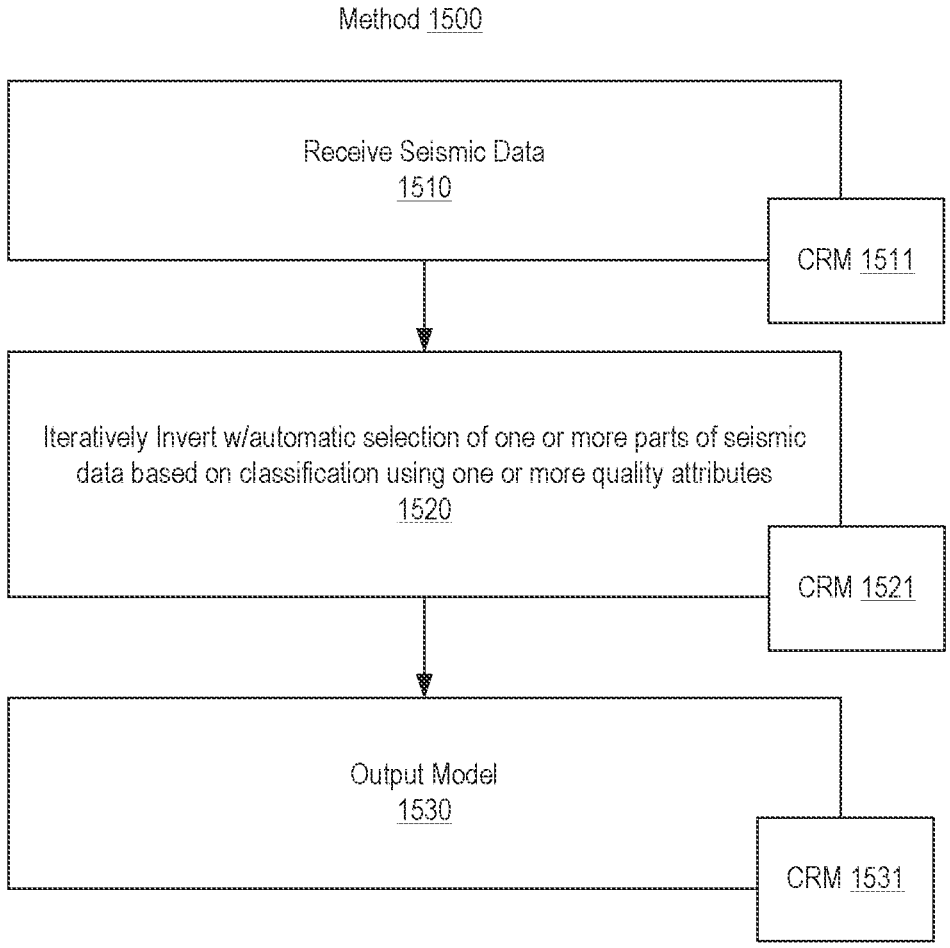
FIG. 15 illustrates an example of a method.

FIG. 15 shows an example of a method 1500 that includes a reception block 1510 for receiving seismic data of a subsurface region; a performance block 1520 for performing an iterative full waveform inversion using at least a portion of the seismic data to generate a model of the subsurface region, where the performing includes, after one or more iterations of the full waveform inversion, automatically selecting one or more parts of the seismic data for inclusion in the at least a portion of the seismic data based on data classification using one or more quality attributes; and an output block 1530 for outputting the model of the subsurface region. In such an example, rendering may occur iteration by iteration or on another basis such that improvements may be visualized.

As explained, a model can be a representation of a physical geologic region where the model characterizes the physical geologic region based on seismic survey data, which can be quite extensive (e.g., ranging from many gigabytes to terabytes). As seismic surveys can be challenging to perform at times and as target regions can be challenging to image, seismic survey data may be lacking in quality where quality can vary over a relatively expansive volumetric geologic region. As seismic survey data includes information, via reflection seismology, as to characteristics of a geologic region, it can be used in an inversion to generate a model of the geologic region. As explained, where data quality can be controlled during an inversion, the inversion can be improved and can generate an improved result, which can be an improved model (e.g., an improved velocity model, etc.) that characterizes the geologic region. As explained, an improved model can be a basis for simulation, development, planning, drilling, EOR, etc., where such workflows can be more accurate given the improved model.

As an example, an interpretation process, machine and/or human, may operate on images or image data to facilitate structure recognition. For example, consider an iterative segmentation process that can segment image data to identify one or more structural features in a subsurface environment, where, for example, hydrocarbons may be likely to exist or proven to exist. As an example, a recognition, segmentation, interpretation, etc., type of process may operate iteratively where results can be rendered to a display such that a user may see one or more structures being more particularly identified as being improved via iterative iteration. As an example, identified structure(s) can be utilized in model building. For example, consider building an earth model that can be suitable for use in simulating one or more physical phenomena using one or more simulators.

FIG. 15 also shows various computer-readable medium (CRM) blocks 1511, 1521 and 1531, which can include computer-executable instructions (e.g., processor-executable instructions) that can instruct a system to perform one or more of the actions associated with the method 1500. For example, consider the system 350 of FIG. 3 where one or more of the CRM blocks can be included as the instructions 370 or as at least a portion of the instructions 370.

Figure 16:
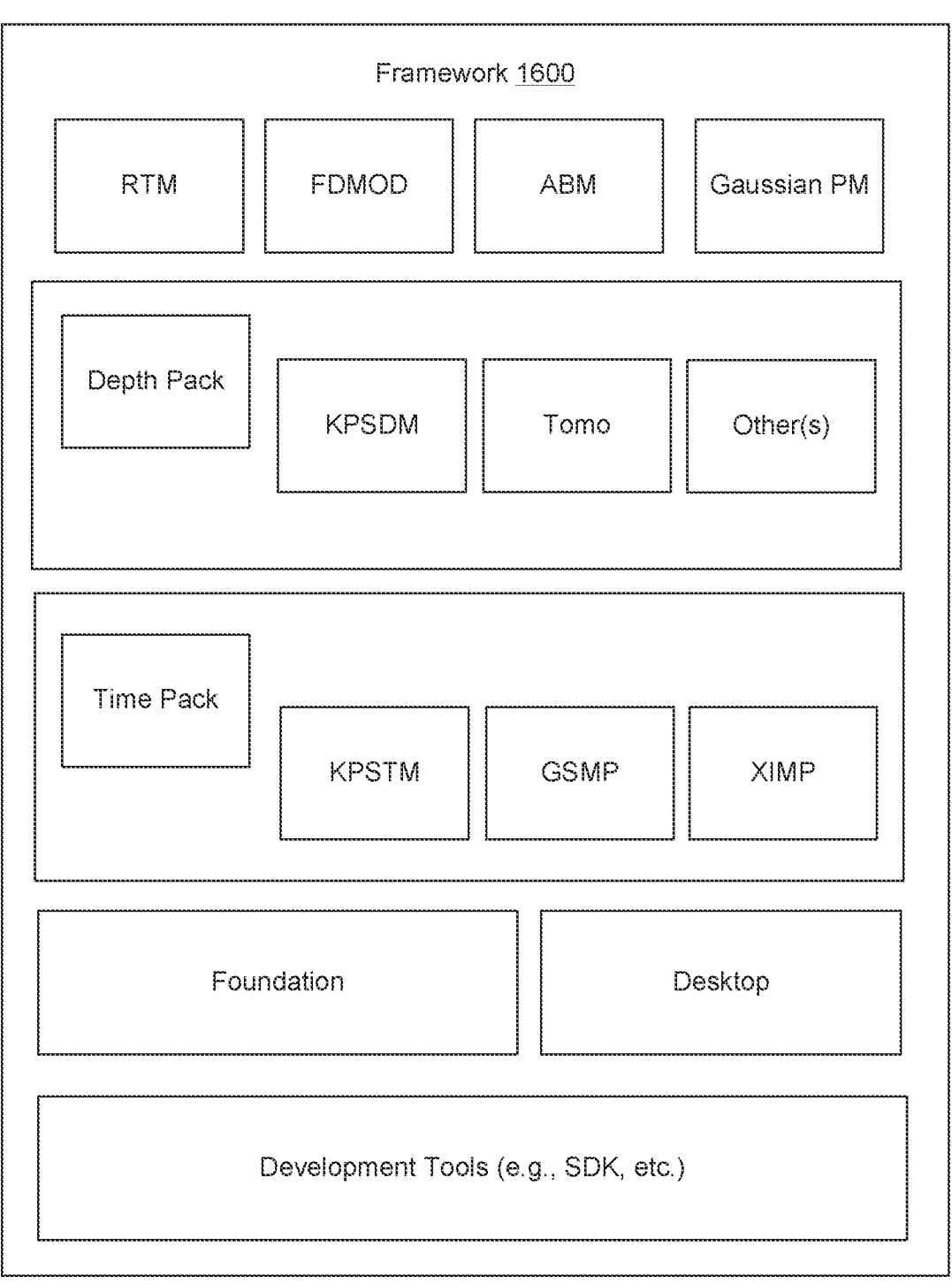
FIG. 16 illustrates an example of a computational framework.

FIG. 16 shows an example of a computational framework 1600 that can include one or more processors and memory, as well as, for example, one or more interfaces. The blocks of the computational framework 1600 may be provided as instructions such as the instructions 370 of the system 350 of FIG. 3. The computational framework of FIG. 16 can include one or more features of the OMEGA framework (SLB, Houston, Texas), which includes finite difference modelling (FDMOD) features for two-way wavefield extrapolation modelling, generating synthetic shot gathers with and without multiples. The FDMOD features can generate synthetic shot gathers by using full 3D, two-way wavefield extrapolation modelling, which can utilize wavefield extrapolation logic matches that are used by reverse-time migration (RTM). A model may be specified on a dense 3D grid as velocity and optionally as anisotropy, dip, and variable density.

As shown in FIG. 16, the computational framework 1600 includes features for RTM, FDMOD, adaptive beam migration (ABM), Gaussian packet migration (Gaussian PM), depth processing (e.g., Kirchhoff prestack depth migration (KPSDM), tomography (Tomo)), time processing (e.g., Kirchhoff prestack time migration (KPSTM), general surface multiple prediction (GSMP), extended interbed multiple prediction (XIMP)), framework foundation features, desktop features (e.g., GUIs, etc.), and development tools.

The framework 1600 can include features for geophysics data processing. The framework 1600 can allow for processing various types of data such as, for example, one or more of: land, marine, and transition zone data; time and depth data; 2D, 3D, and 4D surveys; isotropic and anisotropic (TTI and VTI) velocity fields; and multicomponent data.

The framework 1600 can allow for transforming seismic, electromagnetic, microseismic, and/or vertical seismic profile (VSP) data into actionable information, for example, to perform one or more actions in the field for purposes of resource production, etc. The framework 1600 can extend workflows into reservoir characterization and earth modelling. For example, the framework 1600 can extend geophysics data processing into reservoir modelling by integrating with the DELFI environment and/or the PETREL framework via the Earth Model Building (EMB) tools, which enable a variety of depth imaging workflows, including model building, editing and updating, depth-tomography QC, residual moveout analysis, and volumetric common-image-point (CIP) pick QC. Such functionalities, in conjunction with the framework's depth tomography and migration algorithms, can produce accurate and precise images of the subsurface. The framework 1600 may provide support for field to final imaging, to prestack seismic interpretation and quantitative interpretation, from exploration to development.

As an example, the FDMOD component can be instantiated via one or more CPUs and/or one or more GPUs for one or more purposes. For example, consider utilizing the FDMOD for generating synthetic shot gathers by using full 3D, two-way wavefield extrapolation modelling, the same wavefield extrapolation logic matches that are used by reverse-time migration (RTM). FDMOD can model various aspects and effects of wave propagation. The output from FDMOD can be or include synthetic shot gathers including direct arrivals, primaries, surface multiples, and interbed multiples. The model can be specified on a dense 3D grid as velocity and optionally as anisotropy, dip, and variable density. As an example, survey designs can be modelled to ensure quality of a seismic survey, which may account for structural complexity of the model. Such an approach can enable evaluation of how well a target zone will be illuminated. Such an approach may be part of a quality control process (e.g., task) as part of a seismic workflow. As an example, a FDMOD approach may be specified as to size, which may be model size (e.g., a grid cell model size). Such a parameter can be utilized in determining resources to be allocated to perform a FDMOD related processing task. For example, a relationship between model size and CPUs, GPUs, etc., may be established for purposes of generating results in a desired amount of time, which may be part of a plan (e.g., a schedule) for a seismic interpretation workflow.

As an example, as survey data become available, interpretation tasks may be performed for building, adjusting, etc., one or more models of a geologic environment. For example, consider a vessel that transmits a portion of acquired data while at sea and that transmits a portion of acquired data while in port, which may include physically offloading one or more storage devices and transporting such one or more storage devices to an onshore site that includes equipment operatively coupled to one or more networks (e.g., cable, etc.). As data are available, options exist for tasks to be performed.

As an example, the framework 1600 can include one or more sets of instructions executable to perform one or more methods such as, for example, the method of FIG. 15, etc.

As explained, one or more frameworks, processes, techniques, etc., may implement machine learning and/or one or more machine learning models. As mentioned, machine learning may utilize unsupervised learning such as for classification and/or clustering. As an example, machine learning may utilize supervised and/or unsupervised learning where supervised learning can involve utilization of labeled data. For example, consider one or more types of human labeled data (e.g., seismic interpretation data, etc.) and/or one or more types of machine labeled data, which may include synthetic labeled data (e.g., consider augmentation of labeled data to increase amount of data available for machine learning, etc.).

As to some examples of types of machine learning and/or machine learning models that may be implemented for one or more purposes, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUS)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a method can include receiving seismic data of a subsurface region; performing an iterative full waveform inversion using at least a portion of the seismic data to generate a model of the subsurface region, where the performing includes, after one or more iterations of the full waveform inversion, automatically selecting one or more parts of the seismic data for inclusion in the at least a portion of the seismic data based on data classification using one or more quality attributes; and outputting the model of the subsurface region.

As an example, one or more quality attributes can include a quality attribute derived from model generated synthetic data for a sub-region and from seismic data corresponding to the sub-region. As an example, size of a sub-region can increase with respect to increasing iterations. As an example, a method can include analyzing an increase in size of a sub-region with respect to increasing iterations (e.g., a change in size, etc.) and, based on the analyzing, controlling performing of an inversion.

As an example, a model can be or include a velocity model.

As an example, seismic data can be or include gathers.

As an example, data classification can utilize one or more classes. For example, one or more classes can include at least one class defined by an objective function. In such an example, the objective function can be or include a least squares objective function and/or a travel-time objective function.

As an example, a method can include automatically selecting that includes automatically weighting. As an example, automatically selecting can include using a mask that corresponds to one or more classes of data classification, applying different weightings to different classes of the data classification, automatic selection of an objective function, etc.

As an example, a method can include computing misfit as an indicator of convergence.

As an example, one or more quality attributes can include one or more of a dip attribute, a time delay attribute, a correlation coefficient attribute, a matching filter attribute, a coherency attribute, and a dynamic time warping attribute.

As an example, a method can include performing a simulation using an output model. For example, consider a fluid flow simulation of fluid flow in a subsurface region.

As an example, a subsurface region can include a land subsurface region and/or a marine subsurface region.

As an example, a system can include a processor; memory accessible by the processor; and processor-executable instructions stored in the memory that are executable to instruct the system to: receive seismic data of a subsurface region; perform an iterative full waveform inversion using at least a portion of the seismic data to generate a model of the subsurface region, where the performance includes, after one or more iterations of the full waveform inversion, automatic selection of one or more parts of the seismic data for inclusion in the at least a portion of the seismic data based on data classification using one or more quality attributes; and output the model of the subsurface region.

As an example, one or more computer-readable storage media can include computer-executable instructions executable to instruct a computer to: receive seismic data of a subsurface region; perform an iterative full waveform inversion using at least a portion of the seismic data to generate a model of the subsurface region, where the performance includes, after one or more iterations of the full waveform inversion, automatic selection of one or more parts of the seismic data for inclusion in the at least a portion of the seismic data based on data classification using one or more quality attributes; and output the model of the subsurface region.

A computer-readable storage medium (or computer-readable storage media) is non-transitory, not a signal and not a carrier wave. Rather, a computer-readable storage medium is a physical device that can be considered to be circuitry or hardware.

Figure 17:
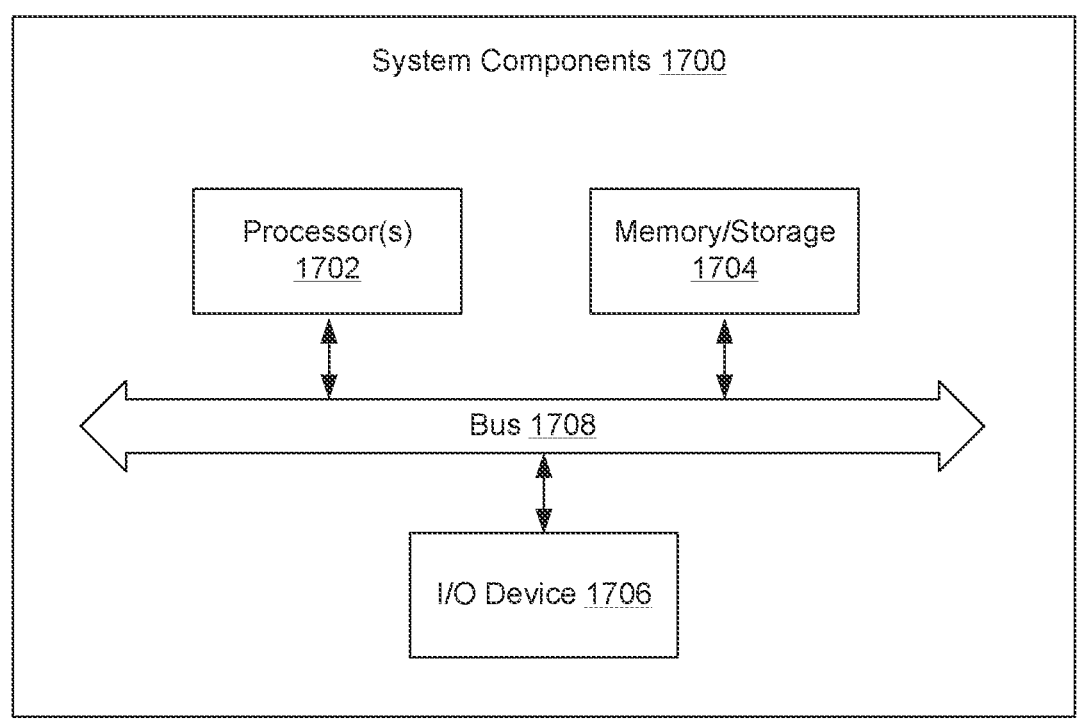
FIG. 17 illustrates example components of a system and a networked system.
Figure 17:
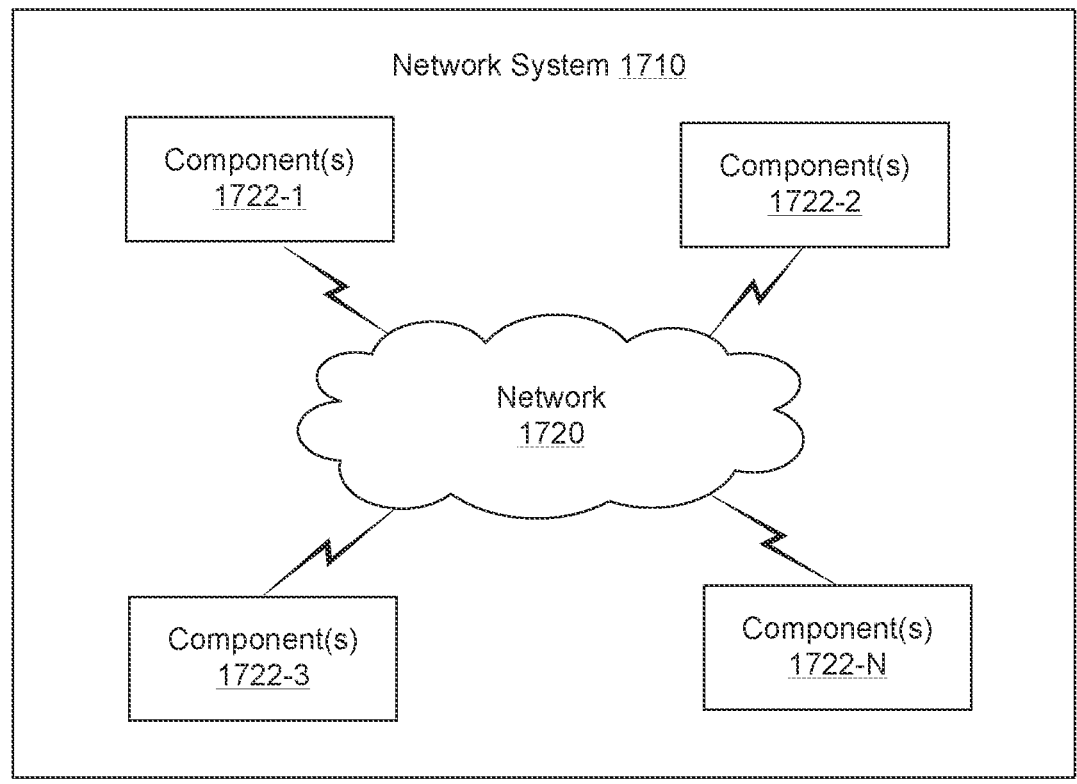

FIG. 17 shows components of an example of a computing system 1700 and an example of a networked system 1710 with a network 1720. The system 1700 includes one or more processors 1702, memory and/or storage components 1704, one or more input and/or output devices 1706 and a bus 1708. In an example embodiment, instructions may be stored in one or more computer-readable media (e.g., memory/storage components 1704). Such instructions may be read by one or more processors (e.g., the processor(s) 1702) via a communication bus (e.g., the bus 1708), which may be wired or wireless. The one or more processors may execute such instructions to implement (wholly or in part) one or more attributes (e.g., as part of a method). A user may view output from and interact with a process via an I/O device (e.g., the device 1706). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1710. The network system 1710 includes components 1722-1, 1722-2, 1722-3, . . . 1722-N. For example, the components 1722-1 may include the processor(s) 1702 while the component(s) 1722-3 may include memory accessible by the processor(s) 1702. Further, the component(s) 1722-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:
receiving seismic data of a subsurface region;
performing an iterative full waveform inversion using at least a portion of the seismic data to generate a model of the subsurface region, wherein the performing includes, after one or more iterations of the full waveform inversion, automatically selecting one or more parts of the seismic data for inclusion in the at least a portion of the seismic data based on data classification using one or more quality attributes, wherein the one or more quality attributes include a quality attribute derived from model generated synthetic data for a sub-region and from seismic data corresponding to the sub-region, and wherein a size of the sub-region increases with respect to increasing iterations; and
outputting the model of the subsurface region.

2. The method of claim 1, comprising analyzing the increase in the size of the sub-region with respect to increasing iterations and, based on the analyzing, controlling the performing.

3. The method of claim 1, wherein the model includes a velocity model.

4. The method of claim 1, wherein the seismic data include gathers.

5. The method of claim 1, wherein the data classification utilizes one or more classes.

6. The method of claim 5, wherein the one or more classes include at least one class defined by an objective function.

7. The method of claim 6, wherein the objective function includes a least squares objective function or a travel-time objective function.

8. The method of claim 1, wherein the automatically selecting includes automatically weighting.

9. The method of claim 1, wherein automatically selecting includes using a mask that corresponds to one or more classes of the data classification.

10. The method of claim 1, wherein automatically selecting includes applying different weightings to different classes of the data classification.

11. The method of claim 1, wherein the automatically selecting includes automatic selection of an objective function.

12. The method of claim 1, wherein the one or more quality attributes include one or more of a dip attribute, a time delay attribute, a correlation coefficient attribute, a matching filter attribute, a coherency attribute, and a dynamic time warping attribute.

13. The method of claim 1, comprising performing a simulation using the output model.

14. The method of claim 13, wherein the simulation includes a fluid flow simulation of fluid flow in the subsurface region.

15. The method of claim 1, wherein the subsurface region includes a land subsurface region or a marine subsurface region.

16. A system comprising:
a processor;
memory accessible by the processor; and
processor-executable instructions stored in the memory that are executable to instruct the system to:
receive seismic data of a subsurface region;
perform an iterative full waveform inversion using at least a portion of the seismic data to generate a model of the subsurface region, wherein the performance includes, after one or more iterations of the full waveform inversion, automatic selection of one or more parts of the seismic data for inclusion in the at least a portion of the seismic data based on data classification using one or more quality attributes, wherein the one or more quality attributes include a quality attribute derived from model generated synthetic data for a sub-region and from seismic data corresponding to the sub-region, and wherein a size of the sub-region increases with respect to increasing iterations; and
output the model of the subsurface region.

17. One or more non-transitory computer-readable storage media comprising computer-executable instructions executable to instruct a computer to:
receive seismic data of a subsurface region;
perform an iterative full waveform inversion using at least a portion of the seismic data to generate a model of the subsurface region, wherein the performance includes, after one or more iterations of the full waveform inversion, automatic selection of one or more parts of the seismic data for inclusion in the at least a portion of the seismic data based on data classification using one or more quality attributes, wherein the one or more quality attributes include a quality attribute derived from model generated synthetic data for a sub-region and from seismic data corresponding to the sub-region, and wherein a size of the sub-region increases with respect to increasing iterations; and
output the model of the subsurface region.

* * * * *